(12) United States Patent
Chakrabarti et al.

(10) Patent No.: US 12,511,693 B2
(45) Date of Patent: Dec. 30, 2025

(54) SYSTEMS AND METHODS FOR GLOBAL OPERATIONS DISPLAY

(71) Applicant: Honeywell International Inc., Charlotte, NC (US)

(72) Inventors: Anish Chakrabarti, Cincinnati, OH (US); Garrett Rysko, Bellevue, WA (US); Akash Jain, Dallas, TX (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 80 days.

(21) Appl. No.: 18/061,222

(22) Filed: Dec. 2, 2022

(65) Prior Publication Data

US 2023/0401643 A1    Dec. 14, 2023

Related U.S. Application Data

(60) Provisional application No. 63/366,213, filed on Jun. 10, 2022.

(51) Int. Cl.
*G06Q 40/06* (2012.01)
*G06Q 10/0639* (2023.01)
*G10L 15/22* (2006.01)

(52) U.S. Cl.
CPC ....... *G06Q 40/06* (2013.01); *G06Q 10/06393* (2013.01); *G10L 15/22* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 8,026,814 B1 * | 9/2011 | Heinze | G08B 13/1427 340/572.1 |
| 11,132,373 B1 * | 9/2021 | Timko | G06F 16/9038 |
| 2004/0024662 A1 * | 2/2004 | Gray | G06Q 10/10 705/29 |
| 2006/0010164 A1 * | 1/2006 | Netz | G06Q 10/06 |

(Continued)

OTHER PUBLICATIONS

Dotoli, Mariagrazia, et al. "An integrated approach for warehouse analysis and optimization: A case study." Computers in Industry 70 (2015): 56-69 (Year: 2015).*

(Continued)

*Primary Examiner* — Darlene Garcia-Guerra
(74) *Attorney, Agent, or Firm* — ALSTON & BIRD LLP

(57) ABSTRACT

A method for monitoring performance of one or more a warehouses, including steps to receive a request to generate a dashboard visualization associated with a portfolio of assets, the request comprising: a location of the portfolio of assets; and at least one KPI descriptor; and in response to the request: obtain, based on the location of the portfolio of assets and the KPI descriptor, aggregated data associated with the portfolio of assets; determine metrics associated with the portfolio of as2sets for the aggregated data; and provide the dashboard visualization to an electronic interface of a computing device, the dashboard visualization comprising the metrics associated with the portfolio of assets, and optimize one or more process conditions for one or more assets associated with the portfolio of assets based on the aggregated data.

16 Claims, 15 Drawing Sheets

(56) References Cited

U.S. PATENT DOCUMENTS

| | | | | |
|---|---|---|---|---|
| 2010/0265061 | A1* | 10/2010 | Harmon | G06Q 10/08 340/539.13 |
| 2010/0286937 | A1* | 11/2010 | Hedley | G06Q 50/06 702/60 |
| 2011/0208562 | A1* | 8/2011 | Hartley | G06Q 30/02 715/764 |
| 2016/0246840 | A1* | 8/2016 | Masiero | G06F 16/9032 |
| 2017/0006135 | A1* | 1/2017 | Siebel | G06F 8/24 |
| 2019/0287006 | A1* | 9/2019 | Costabello | G06N 5/045 |
| 2020/0241990 | A1* | 7/2020 | Gustafson | G06F 11/3089 |
| 2021/0173387 | A1* | 6/2021 | Raza | G06Q 10/0637 |
| 2022/0343244 | A1* | 10/2022 | Yesudas | G06N 5/04 |
| 2023/0017142 | A1* | 1/2023 | Dunn | H04L 67/12 |
| 2023/0196242 | A1* | 6/2023 | Kumar | G06F 16/9024 705/7.27 |
| 2023/0267400 | A1* | 8/2023 | Nicotera | G06N 3/09 705/7.25 |
| 2023/0393557 | A1* | 12/2023 | Shah | H04L 67/56 |

OTHER PUBLICATIONS

Singh, Priyanka, et al. "A Survey Paper on Identifying Key Performance Indicators for Optimizing Inventory Management System and Exploring Different Visualization Tools." 2020 4th International Conference on Intelligent Computing and Control Systems (ICICCS). IEEE, 2020 (Year: 2020).*

Faveto, Alberto, et al. "Development of a key performance indicator framework for automated warehouse systems." IFAC-PapersOnLine 54.1 (2021): 116-121 (Year: 2021).*

* cited by examiner

FIG. 10

SYSTEMS AND METHODS FOR GLOBAL OPERATIONS DISPLAY

CROSS REFERENCE TO RELATED APPLICATIONS

This application claims the benefit of priority under 35 U.S.C. § 119 from U.S. Provisional Patent Application No. 63/366,213, filed on Jun. 10, 2022, the contents of which are incorporated by reference in their entirety.

TECHNICAL FIELD

The present disclosure relates generally to methods and systems to optimize operations in a workplace such as a warehouse or distribution center.

BACKGROUND

Warehouses and distribution centers where employees are often engaged in a multitude of tasks can benefit from receiving real time and historical data from other sources. Further, overall operations can benefit from transmitting real time and historical data to optimize employee operations. Data patterns and trends can be determined from the received data, and the recipient can utilize the data patterns and trends to perform meaningful actions. In practice, employee task optimization is often lacking since a significant amount of optimization benefits have remained unreachable. Therefore, there is a need for a system for collecting and analyzing real-time data from employees, and also for sharing critical data through a streamlined communication network.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

In one embodiment, a system for monitoring performance of one or more a warehouses, includes one or more processors; a memory; and one or more programs stored in the memory, the one or more programs include instructions configured to receive a request to generate a dashboard visualization associated with a portfolio of assets, the request comprising: a location of the portfolio of assets; and at least one KPI descriptor; and in response to the request: obtain, based on the location of the portfolio of assets and the KPI descriptor, aggregated data associated with the portfolio of assets; determine metrics associated with the portfolio of assets for the aggregated data; and provide the dashboard visualization to an electronic interface of a computing device, the dashboard visualization comprising the metrics associated with the portfolio of assets, and optimize one or more process conditions for one or more assets associated with the portfolio of assets based on the aggregated data.

In another embodiment, a method of monitoring performance of one or more a warehouses includes receiving a request to generate a dashboard visualization associated with a portfolio of assets, the request including: a location of the portfolio of assets; and at least one KPI descriptor; and in response to the request: obtaining, based on the location of the portfolio of assets and the KPI descriptor, aggregated data associated with the portfolio of assets; determining metrics associated with the portfolio of assets for the aggregated data; and providing the dashboard visualization to an electronic interface of a computing device, the dashboard visualization comprising the metrics associated with the portfolio of assets, and optimizing one or more process conditions for one or more assets associated with the portfolio of assets based on the aggregated data.

In yet another embodiment, a system includes: at least one warehouse, each at least one warehouse including a plurality of edge devices configured to access a network; and a computing device comprising: a display; one or more processors; a memory including one or more programs stored therein, which, when executed by the one or more processors, cause the computing device to: receive, from the plurality of edge devices, aggregated data associated with the plurality of edge devices; determine metrics associated with the plurality of edge devices for the aggregated data; and provide a dashboard visualization to the display, the dashboard visualization comprising the metrics associated with the plurality of edge devices, and optimize one or more process conditions for one or more assets associated with the plurality of edge devices based on the aggregated data wherein the visualization is based on: a location of the at least one warehouse, and at least one KPI descriptor.

To the accomplishment of the foregoing and related ends, certain illustrative aspects are described herein in connection with the following description and the appended drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

BRIEF DESCRIPTION OF THE DRAWINGS

Embodiments of the disclosure will now be described, by way of example only, with reference to the accompanying drawings in which:

FIG. 10 illustrates another exemplary electronic interface, in accordance with one or more embodiments described herein;

DETAILED DESCRIPTION

Figure 1:
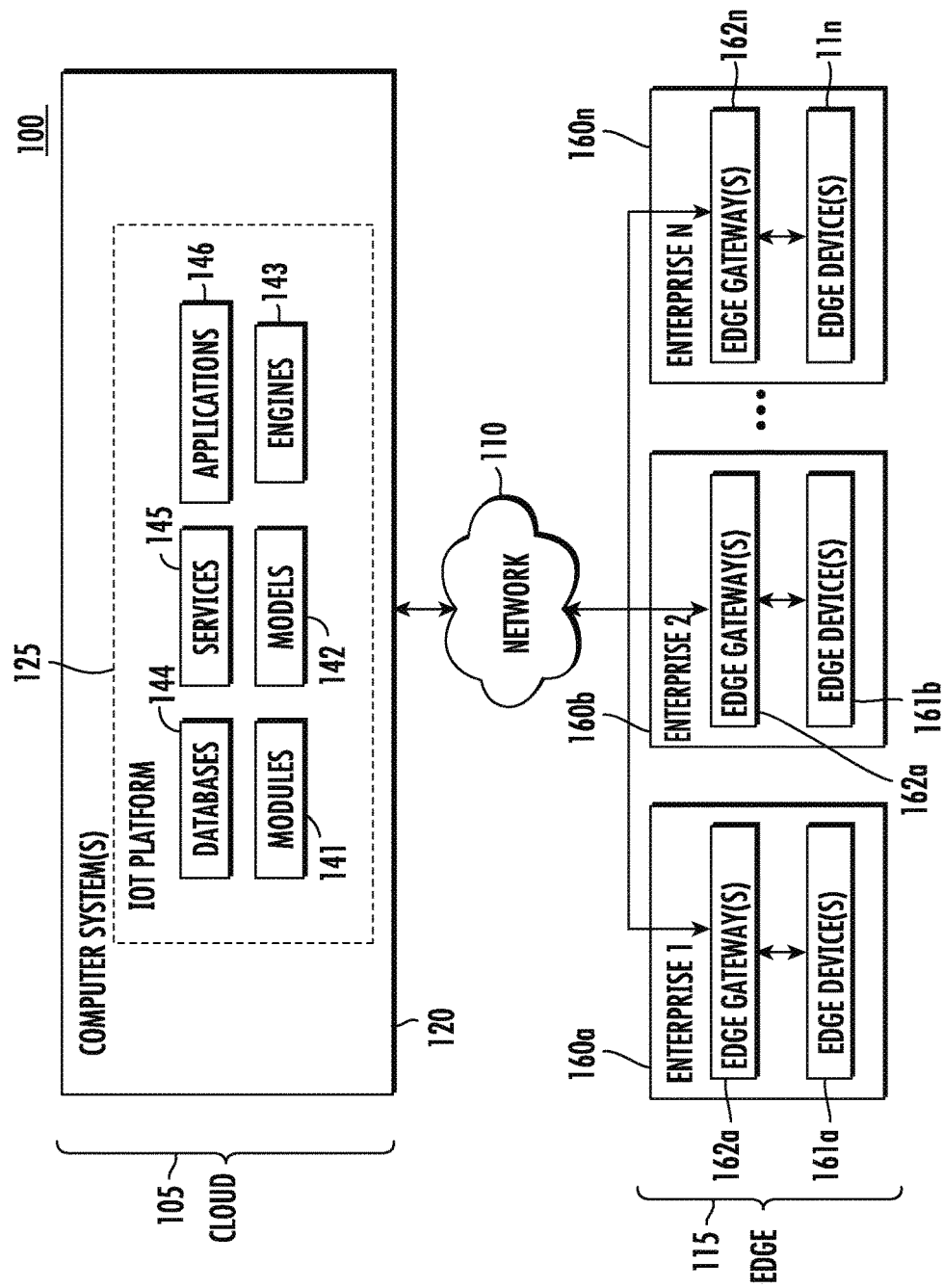
FIG. 1 illustrates an exemplary networked computing system environment, in accordance with one or more embodiments described herein.

The following embodiments describe systems and methods for facilitating a connected warehouse as between employees, managers, global operations supervisors, and other users as well as inter- and intra-warehouse edge communications systems.

Previous warehouse systems have included workers, such as employees, as well as operations managers and shift supervisors. Operations managers can be responsible for meeting production quotas, managing labor fluctuations, and quickly identifying restrictions and bottlenecks. Shift supervisors can be responsible for worker performance, overseeing specific work-sites and/or warehouse areas, and being generally "hands-on" on the warehouse floor. Collectively, each can balance warehouse staffing to prevent bottlenecks, ensure quality and timeliness of orders are fulfilled, improve throughput, maximize utilization, monitor and manage each site, and ensure smooth working of the warehouse.

That said, current approaches used to-date have suffered from various drawbacks. For example, current approaches are disconnected from viewing regional productivity in real time due to the incapability of determining site productivity until the end of a shift or workday. This may make production degradations and bottlenecks difficult to track and/or predict.

A dynamic and decentralized technique for determining regional productivity through implementation of a connected and automated warehouse system is provided. An embodiment or implementation described herein as "dynamic" is intended to reflect or indicate that the embodiment(s) is or can be marked by continuous and productive activity or change, though not necessarily constantly changing. The system and corresponding techniques facilitate communications within and between one or more warehouses, between users (e.g., worker, teams of workers, manager, etc.), third parties associated therewith, and data centers. Such communications may be facilitated by edge systems and gateway systems. The edge and gateway systems may be located in warehouses (i.e., on-site) as embedded or fixed systems and/or other user devices such as tablet PCs and mobile phones. Each edge system may be coupled to a warehouse system from which warehouse operations data may be collected, and in communication with other edge systems and gateway systems. Each gateway system may be in communication with warehouse operation systems and edge systems of the warehouse in which the gateway system is resident, and may also be in communication with gateway systems located in other warehouses, all or some of which may provide data to the gateway system. By facilitating communication with gateway systems located in other warehouses, the gateway system may enable exchange of data among edge systems installed in different warehouses. Independent user computing devices, such as tablet PCs and mobile phones, may be directly coupled to and/or in communication with the edge systems and/or gateway systems, to request, filter, view, and/or analyze data.

Hardware for all or some of the edge systems and gateway systems may be installed in warehouses. Therefore, software may be installed on the corresponding warehouse hardware. The software implemented in the edge systems and gateway systems may comprise computer-executable code for performing various data functions, including but not limited to, data request, data query, data retrieval, data transmission, and data analytics. The edge systems and gateway systems each identify source(s) of relevant data, and request that data be provided dynamically (as needed) or statically (all the time) from the identified source(s), such as from other edge systems coupled to warehouse systems in the warehouse or other warehouses, gateway systems in the warehouse or other warehouses, decentralized system(s) such as cloud computing center(s), and centralized system(s) such as dedicated server farms. The decentralized system(s) and centralized system(s) may be owned by the operators of the warehouses, or by a third party such as a government or a commercial entity.

Each edge system in a warehouse may be coupled to a sensor of a corresponding warehouse system in the same warehouse, enabling data captured by the sensor to be provided directly to the edge system. Also, a gateway system in a warehouse may be coupled to one or more sensors of warehouse systems in the same warehouse, enabling data captured by the one or more sensors to be provided directly to the gateway system. In another embodiment, each edge system in a warehouse may be coupled to warehouse system of a corresponding warehouse system in the same warehouse. Also, a gateway system in a warehouse may be coupled to warehouse system machines of warehouse systems in the same warehouse. In some aspects, warehouse system machines may be configured to collect data from the coupled one or more sensors, perform computations and/or analysis of the collected data, store the collected and/or analyzed data in memory, and provide the collected and/or analyzed data to one or more connected edge systems and/or gateway system. In some embodiments, the warehouse system may not be implemented, or may not be coupled to the one or more sensors of the warehouse system. If the warehouse system machine is not implemented or not coupled to the one or more sensors, data captured by the one or more sensors may be provided directly to the one or more connected edge systems and/or gateway system.

Each warehouse system may be in communication with, through an edge system or not, a gateway system. Edge systems in a warehouse may be in direct communication with one another. For example, any data retained by one edge system may be transmitted directly to another edge system within the same warehouse, without a gateway system acting as an intermediary. In another embodiment, an edge system may send to or receive data from another edge system located in the same warehouse through a gateway system. The communication between the edge systems and the communication between the edge systems and the gateway system may be through a wired or wireless connection.

A gateway system of a warehouse may be in communication with gateway systems of other warehouses. Through this communication path, an edge system or a gateway system of a warehouse may transmit data to and obtain data from edge systems or gateway systems of other warehouses. The communication path between gateway systems of different warehouses may be through satellite communications (e.g., SATCOM), cellular networks, Wi-Fi (e.g., IEEE 802.11 compliant), WiMAx (e.g., AeroMACS), optical fiber, and/or air-to-ground (ATG) network, and/or any other communication links now known or later developed. An edge system in a warehouse may communicate with another edge system in a different warehouse via gateway systems of the respective warehouses. For example, an edge system in a warehouse may transmit data to one or more edge systems in other warehouses via the gateway systems of the respective warehouses communicating over the communication path discussed above.

Each edge system and gateway system may comprise state machines, such as processor(s) coupled to memory. Both the edge systems and the gateway systems may be configured with a common operating system to support portable, system-wide edge software implementations. In other words, each of the edge systems and the gateway systems may be equipped with standard software to facilitate inter-operability among the edge systems and the gateway systems. In the discussion below, such software will be referred to as edge software. The edge software may enable each edge system or gateway system to perform various functions listed below (non-exhaustive) to enable data analysis and data exchange among the various systems illustrated herein (e.g., edge systems, gateway systems, warehouse operations centers, remote systems):

Filter and analyze real-time and stored data collected from other edge systems, warehouse systems, gateway systems, and/or operations center(s), and generate events based on the analysis;

Identify dynamic (i.e., as needed) and static (i.e., all the time) data transmission targets (e.g., edge systems within the same warehouse, edge systems in other warehouses, operations center(s));

Transmit data over an Internet connection to the operations centers;

Transmit data and events to other edge and gateway systems within an aircraft that are connected over wired/wireless networks, or to other edge and gateway systems external to the aircraft that are connected over the Internet;

Provide a request/response interface for other edge/gateway systems, warehouse borne computer systems, operations centers, and remote systems connected over wired/wireless networks or Internet to query the stored data and to dynamically select/change data filters;

Use request/response interfaces provided by other edge systems, gateway systems, and operations centers connected over wired/wireless networks or Internet to obtain data and to dynamically select/change data filters;

Receive events from other edge systems, gateway systems, and operations centers; and Specify and communicate generic purposes (i.e., types of data the edge/gateway system is interested in) to other edge systems, gateway systems, and operations centers.

Each edge system or gateway system may autonomously select and deliver data to one or more transmission targets, which may be other edge systems in the same warehouse, edge systems in other warehouses, gateway system in the same warehouse, gateway systems in other warehouses, or operations center(s). Each of the receiving edge or gateway systems (i.e., transmission targets) may be configured to filter the received data using a pre-defined filter, overriding the autonomous determination made by the edge system transmitting the data. In some embodiment, each receiving edge or gateway system may notify the other systems, in advance of the data transmission, of the types of data and/or analysis the receiving system wants to receive (i.e., generic "purposes"). Also, each edge or gateway system may maintain a list including static data transmission targets (transmission targets that always need the data) and dynamic data transmission targets (transmission targets that need the data on as-needed basis).

A gateway system of a warehouse may also be in communication with one or more operations centers, which may be located remotely from the warehouse (i.e., off-site). In some embodiments, however, the operations center(s) may be located on-site at the warehouse. Each of the warehouse systems of this disclosure may be implemented in a dedicated location, such as a server system, or may be implemented in a decentralized manner, for example, as part of a cloud system. The communication path between the gateway systems and the operations center(s) may be through satellite communications (e.g., SATCOM), cellular networks, Wi-Fi (e.g., IEEE 802.11 compliant), WiMAx (e.g., AeroMACS), optical fiber, and/or air-to-ground (ATG) network, and/or any other communication links now known or later developed.

Subject matter will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended reflect or indicate that the embodiment(s) is/are "example" embodiment(s). Subject matter be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). Furthermore, the method presented in the drawings and the specification is not to be construed as limiting the order in which the individual steps may be performed. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment"

or "in some embodiments" as used herein does not necessarily refer to a different embodiment. It is intended, for example, that claimed subject matter include combinations of exemplary embodiments in whole or in part.

FIG. 1 illustrates an exemplary networked computing system environment 100, according to the present disclosure. As shown in FIG. 1, networked computing system environment 100 is organized into a plurality of layers including a cloud 105, a network 110, and an edge 115. As detailed further below, components of the edge 115 are in communication with components of the cloud 105 via network 110.

In various embodiments, network 110 is any suitable network or combination of networks and supports any appropriate protocol suitable for communication of data to and from components of the cloud 105 and between various other components in the networked computing system environment 100 (e.g., components of the edge 115). According to various embodiments, network 110 includes a public network (e.g., the Internet), a private network (e.g., a network within an organization), or a combination of public and/or private networks. According to various embodiments, network 110 is configured to provide communication between various components depicted in FIG. 1. According to various embodiments, network 110 comprises one or more networks that connect devices and/or components in the network layout to allow communication between the devices and/or components. For example, in one or more embodiments, the network 110 is implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 110 is implemented using cellular networks, satellite, licensed radio, or a combination of cellular, satellite, licensed radio, and/or unlicensed radio networks.

Components of the cloud 105 include one or more computer systems 120 that form a so-called "Internet-of-Things" or "IoT" platform 125. It should be appreciated that "IoT platform" is an optional term describing a platform connecting any type of Internet-connected device, and should not be construed as limiting on the types of computing systems useable within IoT platform 125. In particular, in various embodiments, computer systems 120 includes any type or quantity of one or more processors and one or more data storage devices comprising memory for storing and executing applications or software modules of networked computing system environment 100. In one embodiment, the processors and data storage devices are embodied in server-class hardware, such as enterprise-level servers. For example, in an embodiment, the processors and data storage devices comprise any type or combination of application servers, communication servers, web servers, super-computing servers, database servers, file servers, mail servers, proxy servers, and/virtual servers. Further, the one or more processors are configured to access the memory and execute processor-readable instructions, which when executed by the processors configures the processors to perform a plurality of functions of the networked computing system environment 100.

Computer systems 120 further include one or more software components of the IoT platform 125. For example, in one or more embodiments, the software components of computer systems 120 include one or more software modules to communicate with user devices and/or other computing devices through network 110. For example, in one or more embodiments, the software components include one or more modules 141, models 142, engines 143, databases 144, services 145, and/or applications 146, which may be stored in/by the computer systems 120 (e.g., stored on the memory), as detailed with respect to FIG. 2 below. According to various embodiments, the one or more processors are configured to utilize the one or more modules 141, models 142, engines 143, databases 144, services 145, and/or applications 146 when performing various methods described in this disclosure.

Accordingly, in one or more embodiments, computer systems 120 execute a cloud computing platform (e.g., IoT platform 125) with scalable resources for computation and/or data storage, and may run one or more applications on the cloud computing platform to perform various computer-implemented methods described in this disclosure. In some embodiments, some of the modules 141, models 142, engines 143, databases 144, services 145, and/or applications 146 are combined to form fewer modules, models, engines, databases, services, and/or applications. In some embodiments, some of the modules 141, models 142, engines 143, databases 144, services 145, and/or applications 146 are separated into separate, more numerous modules, models, engines, databases, services, and/or applications. In some embodiments, some of the modules 141, models 142, engines 143, databases 144, services 145, and/or applications 146 are removed while others are added.

The computer systems 120 are configured to receive data from other components (e.g., components of the edge 115) of networked computing system environment 100 via network 110. Computer systems 120 are further configured to utilize the received data to produce a result. According to various embodiments, information indicating the result is transmitted to users via user computing devices over network 110. In some embodiments, the computer systems 120 is a server system that provides one or more services including providing the information indicating the received data and/or the result(s) to the users. According to various embodiments, computer systems 120 are part of an entity which include any type of company, organization, or institution that implements one or more IoT services. In some examples, the entity is an IoT platform provider.

Components of the edge 115 include one or more enterprises 160a-160n each including one or more edge devices 161a-161n and one or more edge gateways 162a-162n. For example, a first enterprise 160a includes first edge devices 161a and first edge gateways 162a, a second enterprise 160b includes second edge devices 161b and second edge gateways 162b, and an nth enterprise 160n includes nth edge devices 161n and nth edge gateways 162n. As used herein, enterprises 160a-160n represent any type of entity, facility, or vehicle, such as, for example, companies, divisions, buildings, manufacturing plants, warehouses, real estate facilities, laboratories, aircraft, spacecraft, automobiles, ships, boats, military vehicles, oil and gas facilities, or any other type of entity, facility, and/or entity that includes any number of local devices.

Figure 2:
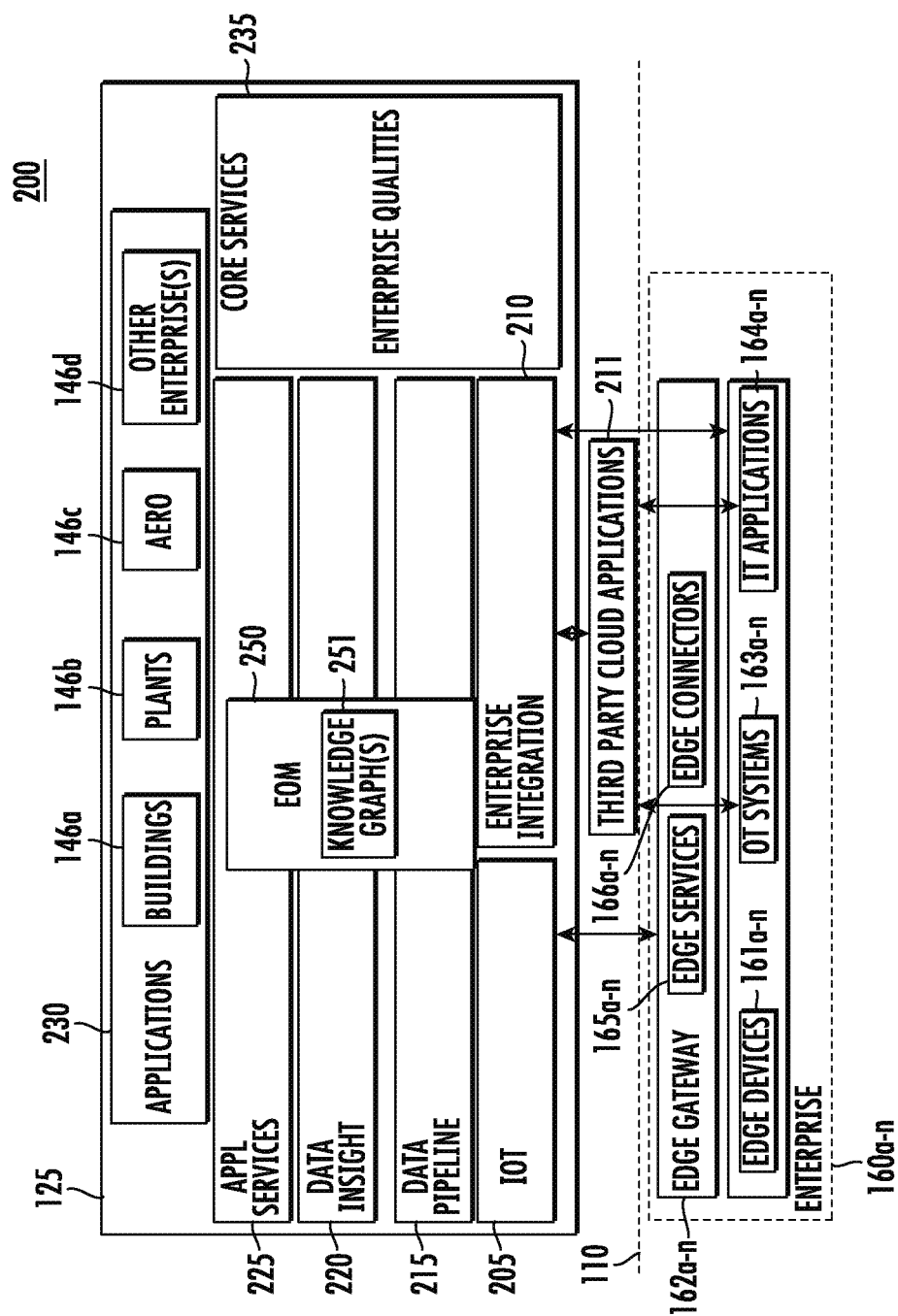
FIG. 2 illustrates a schematic block diagram of a framework of an IoT platform of the networked computing system, in accordance with one or more embodiments described herein.

According to various embodiments, the edge devices 161a-161n represent any of a variety of different types of devices that may be found within the enterprises 160a-160n. Edge devices 161a-161n are any type of device configured to access network 110, or be accessed by other devices through network 110, such as via an edge gateway 162a-162n. According to various embodiments, edge devices 161a-161n are "IoT devices" which include any type of network-connected (e.g., Internet-connected) device. For example, in one or more embodiments, the edge devices 161a-161n include assets, sensors, actuators, processors, computers, valves, pumps, ducts, vehicle components, cameras, displays, doors, windows, security components, boilers, chillers, pumps, HVAC components, factory equipment, and/or any other devices that are connected to the network 110 for collecting, sending, and/or receiving information. Each edge device 161a-161n includes, or is otherwise in communication with, one or more controllers for selectively controlling a respective edge device 161a-161n and/or for sending/receiving information between the edge devices 161a-161n and the cloud 105 via network 110. With reference to FIG. 2, in one or more embodiments, the edge 115 include operational technology (OT) systems 163a-163n and information technology (IT) applications 164a-164n of each enterprise 161a-161n. The OT systems 163a-163n include hardware and software for detecting and/or causing a change, through the direct monitoring and/or control of industrial equipment (e.g., edge devices 161a-161n), assets, processes, and/or events. The IT applications 164a-164n includes network, storage, and computing resources for the generation, management, storage, and delivery of data throughout and between organizations.

The edge gateways 162a-162n include devices for facilitating communication between the edge devices 161a-161n and the cloud 105 via network 110. For example, the edge gateways 162a-162n include one or more communication interfaces for communicating with the edge devices 161a-161n and for communicating with the cloud 105 via network 110. According to various embodiments, the communication interfaces of the edge gateways 162a-162n include one or more cellular radios, Bluetooth, WiFi, near-field communication radios, Ethernet, or other appropriate communication devices for transmitting and receiving information. According to various embodiments, multiple communication interfaces are included in each gateway 162a-162n for providing multiple forms of communication between the edge devices 161a-161n, the gateways 162a-162n, and the cloud 105 via network 110. For example, in one or more embodiments, communication are achieved with the edge devices 161a-161n and/or the network 110 through wireless communication (e.g., WiFi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

According to various embodiments, the edge gateways 162a-162n also include a processor and memory for storing and executing program instructions to facilitate data processing. For example, in one or more embodiments, the edge gateways 162a-162n are configured to receive data from the edge devices 161a-161n and process the data prior to sending the data to the cloud 105. Accordingly, in one or more embodiments, the edge gateways 162a-162n include one or more software modules or components for providing data processing services and/or other services or methods of the present disclosure. With reference to FIG. 2, each edge gateway 162a-162n includes edge services 165a-165n and edge connectors 166a-166n. According to various embodiments, the edge services 165a-165n include hardware and software components for processing the data from the edge devices 161a-161n. According to various embodiments, the edge connectors 166a-166n include hardware and software components for facilitating communication between the edge gateway 162a-162n and the cloud 105 via network 110, as detailed above. In some cases, any of edge devices 161a-n, edge connectors 166a-n, and edge gateways 162a-n have their functionality combined, omitted, or separated into any combination of devices. In other words, an edge device and its connector and gateway need not necessarily be discrete devices.

FIG. 2 illustrates a schematic block diagram of framework 200 of the IoT platform 125, according to the present disclosure. The IoT platform 125 of the present disclosure is a platform for enterprise performance management that uses real-time accurate models and visual analytics to deliver intelligent actionable recommendations and/or analytics for sustained peak performance of the enterprise 160a-160n, for example, to a regional manager of the enterprise. The IoT platform 125 is an extensible platform that is portable for deployment in any cloud or data center environment for providing an enterprise-wide, top to bottom view, displaying the status of processes, assets, people, and safety. Further, the IoT platform 125 supports end-to-end capability to execute digital twins against process data and to translate the output into actionable insights, using the framework 200, detailed further below.

As shown in FIG. 2, the framework 200 of the IoT platform 125 comprises a number of layers including, for example, an IoT layer 205, an enterprise integration layer 210, a data pipeline layer 215, a data insight layer 220, an application services layer 225, and an applications layer 230. The IoT platform 125 also includes a core services layer 235 and an extensible object model (EOM) 250 comprising one or more knowledge graphs 251. The layers 205-235 further include various software components that together form each layer 205-235. For example, in one or more embodiments, each layer 205-235 includes one or more of the modules 141, models 142, engines 143, databases 144, services 145, applications 146, or combinations thereof. In some embodiments, the layers 205-235 are combined to form fewer layers. In some embodiments, some of the layers 205-235 are separated into separate, more numerous layers. In some embodiments, some of the layers 205-235 are removed while others may be added.

The IoT platform 125 is a model-driven architecture. Thus, the extensible object model 250 communicates with each layer 205-230 to contextualize site data of the enterprise 160a-160n using an extensible graph based object model (or "asset model"). In one or more embodiments, the extensible object model 250 is associated with knowledge graphs 251 where the equipment (e.g., edge devices 161a-161n) and processes of the enterprise 160a-160n are modeled. The knowledge graphs 251 of EOM 250 are configured to store the models in a central location. The knowledge graphs 251 define a collection of nodes and links that describe real-world connections that enable smart systems. As used herein, a knowledge graph 251: (i) describes real-world entities (e.g., edge devices 161a-161n) and their interrelations organized in a graphical interface; (ii) defines possible classes and relations of entities in a schema; (iii) enables interrelating arbitrary entities with each other; and (iv) covers various topical domains. In other words, the knowledge graphs 251 define large networks of entities (e.g., edge devices 161a-161n), semantic types of the entities, properties of the entities, and relationships between the entities. Thus, the knowledge graphs 251 describe a network of "things" that are relevant to a specific domain or to an enterprise or organization. Knowledge graphs 251 are not limited to abstract concepts and relations, but can also contain instances of objects, such as, for example, documents and datasets. In some embodiments, the knowledge graphs 251 include resource description framework (RDF) graphs. As used herein, a "RDF graph" is a graph data model that formally describes the semantics, or meaning, of information. The RDF graph also represents metadata (e.g., data that describes data). According to various embodiments, knowledge graphs 251 also include a semantic object model. The semantic object model is a subset of a knowledge graph 251 that defines semantics for the knowledge graph 251. For example, the semantic object model defines the schema for the knowledge graph 251.

As used herein, EOM 250 includes a collection of application programming interfaces (APIs) that enables seeded semantic object models to be extended. For example, the EOM 250 of the present disclosure enables a customer's knowledge graph 251 to be built subject to constraints expressed in the customer's semantic object model. Thus, the knowledge graphs 251 are generated by customers (e.g., enterprises or organizations) to create models of the edge devices 161a-161n of an enterprise 160a-160n, and the knowledge graphs 251 are input into the EOM 250 for visualizing the models (e.g., the nodes and links).

The models describe the assets (e.g., the nodes) of an enterprise (e.g., the edge devices 161a-161n) and describe the relationship of the assets with other components (e.g., the links). The models also describe the schema (e.g., describe what the data is), and therefore the models are self-validating. For example, in one or more embodiments, the model describes the type of sensors mounted on any given asset (e.g., edge device 161a-161n) and the type of data that is being sensed by each sensor. According to various embodiments, a KPI framework is used to bind properties of the assets in the extensible object model 250 to inputs of the KPI framework. Accordingly, the IoT platform 125 is an extensible, model-driven end-to-end stack including: two-way model sync and secure data exchange between the edge 115 and the cloud 105, metadata driven data processing (e.g., rules, calculations, and aggregations), and model driven visualizations and applications. As used herein, "extensible" refers to the ability to extend a data model to include new properties/columns/fields, new classes/tables, and new relations. Thus, the IoT platform 125 is extensible with regards to edge devices 161a-161n and the applications 146 that handle those devices 161a-161n. For example, when new edge devices 161a-161n are added to an enterprise 160a-160n system, the new devices 161a-161n will automatically appear in the IoT platform 125 so that the corresponding applications 146 understand and use the data from the new devices 161a-161n.

In some cases, asset templates are used to facilitate configuration of instances of edge devices 161a-161n in the model using common structures. An asset template defines the typical properties for the edge devices 161a-161n of a given enterprise 160a-160n for a certain type of device. For example, an asset template of a pump includes modeling the pump having inlet and outlet pressures, speed, flow, etc. The templates may also include hierarchical or derived types of edge devices 161a-161n to accommodate variations of a base type of device 161a-161n. For example, a reciprocating pump is a specialization of a base pump type and would include additional properties in the template. Instances of the edge device 161a-161n in the model are configured to match the actual, physical devices of the enterprise 160a-160n using the templates to define expected attributes of the device 161a-161n. Each attribute is configured either as a static value (e.g., capacity is 1000 BPH) or with a reference to a time series tag that provides the value. The knowledge graph 251 can automatically map the tag to the attribute based on naming conventions, parsing, and matching the tag and attribute descriptions and/or by comparing the behavior of the time series data with expected behavior. In one or more embodiments, each of the key attributes contributing to one or more metrics to drive a dashboard is marked with one or more metric tags such that a dashboard visualization is generated.

The modeling phase includes an onboarding process for syncing the models between the edge 115 and the cloud 105. For example, in one or more embodiments, the onboarding process includes a simple onboarding process, a complex onboarding process, and/or a standardized rollout process. The simple onboarding process includes the knowledge graph 251 receiving raw model data from the edge 115 and running context discovery algorithms to generate the model. The context discovery algorithms read the context of the edge naming conventions of the edge devices 161a-161n and determine what the naming conventions refer to. For example, in one or more embodiments, the knowledge graph 251 receives "TMP" during the modeling phase and determine that "TMP" relates to "temperature." The generated models are then published. The complex onboarding process includes the knowledge graph 251 receiving the raw model data, receiving point history data, and receiving site survey data. According to various embodiments, the knowledge graph 251 then uses these inputs to run the context discovery algorithms. According to various embodiments, the generated models are edited and then the models are published. The standardized rollout process includes manually defining standard models in the cloud 105 and pushing the models to the edge 115.

The IoT layer 205 includes one or more components for device management, data ingest, and/or command/control of the edge devices 161a-161n. The components of the IoT layer 205 enable data to be ingested into, or otherwise received at, the IoT platform 125 from a variety of sources. For example, in one or more embodiments, data is ingested from the edge devices 161a-161n through process historians or laboratory information management systems. The IoT layer 205 is in communication with the edge connectors 165a-165n installed on the edge gateways 162a-162n through network 110, and the edge connectors 165a-165n send the data securely to the IoT layer 205. In some embodiments, only authorized data is sent to the IoT platform 125, and the IoT platform 125 only accepts data from authorized edge gateways 162a-162n and/or edge devices 161a-161n. According to various embodiments, data is sent from the edge gateways 162a-162n to the IoT platform 125 via direct streaming and/or via batch delivery. Further, after any network or system outage, data transfer will resume once communication is re-established and any data missed during the outage will be backfilled from the source system or from a cache of the IoT platform 125. According to various embodiments, the IoT layer 205 also includes components for accessing time series, alarms and events, and transactional data via a variety of protocols.

The enterprise integration layer 210 includes one or more components for events/messaging, file upload, and/or REST/OData. The components of the enterprise integration layer 210 enable the IoT platform 125 to communicate with third party cloud applications 211, such as any application(s) operated by an enterprise in relation to its edge devices. For example, the enterprise integration layer 210 connects with enterprise databases, such as guest databases, customer databases, financial databases, patient databases, etc. The enterprise integration layer 210 provides a standard application programming interface (API) to third parties for accessing the IoT platform 125. The enterprise integration layer 210 also enables the IoT platform 125 to communicate with the OT systems 163a-163n and IT applications 164a-164n of the enterprise 160a-160n. Thus, the enterprise integration layer 210 enables the IoT platform 125 to receive data from the third party cloud applications 211 rather than, or in combination with, receiving the data from the edge devices 161a-161n directly.

The data pipeline layer 215 includes one or more components for data cleansing/enriching, data transformation, data calculations/aggregations, and/or API for data streams. Accordingly, in one or more embodiments, the data pipeline layer 215 pre-processes and/or performs initial analytics on the received data. The data pipeline layer 215 executes advanced data cleansing routines including, for example, data correction, mass balance reconciliation, data conditioning, component balancing and simulation to ensure the desired information is used as a basis for further processing. The data pipeline layer 215 also provides advanced and fast computation. For example, cleansed data is run through enterprise-specific digital twins. According to various embodiments, the enterprise-specific digital twins include a reliability advisor containing process models to determine the current operation and the fault models to trigger any early detection and determine an appropriate resolution. According to various embodiments, the digital twins also include an optimization advisor that integrates real-time economic data with real-time process data, selects the right feed for a process, and determines optimal process conditions and product yields.

According to various embodiments, the data pipeline layer 215 employs models and templates to define calculations and analytics. Additionally or alternatively, according to various embodiments, the data pipeline layer 215 employs models and templates to define how the calculations and analytics relate to the assets (e.g., the edge devices 161a-161n). For example, in an embodiment, a pump template defines pump efficiency calculations such that every time a pump is configured, the standard efficiency calculation is automatically executed for the pump. The calculation model defines the various types of calculations, the type of engine that should run the calculations, the input and output parameters, the preprocessing requirement and prerequisites, the schedule, etc. According to various embodiments, the actual calculation or analytic logic is defined in the template or it may be referenced. Thus, according to various embodiments, the calculation model is employed to describe and control the execution of a variety of different process models. According to various embodiments, calculation templates are linked with the asset templates such that when an asset (e.g., edge device 161a-161n) instance is created, any associated calculation instances are also created with their input and output parameters linked to the appropriate attributes of the asset (e.g., edge device 161a-161n).

According to various embodiments, the IoT platform 125 supports a variety of different analytics models including, for example, first principles models, empirical models, engineered models, user-defined models, machine learning models, built-in functions, and/or any other types of analytics models. Fault models and predictive maintenance models will now be described by way of example, but any type of models may be applicable.

Fault models are used to compare current and predicted enterprise 160a-160n performance to identify issues or opportunities, and the potential causes or drivers of the issues or opportunities. The IoT platform 125 includes rich hierarchical symptom-fault models to identify abnormal conditions and their potential consequences. For example, in one or more embodiments, the IoT platform 125 drill downs from a high-level condition to understand the contributing factors, as well as determining the potential impact a lower level condition may have. There may be multiple fault models for a given enterprise 160a-160n looking at different aspects such as process, equipment, control, and/or operations. According to various embodiments, each fault model identifies issues and opportunities in their domain, and can also look at the same core problem from a different perspective. According to various embodiments, an overall fault model is layered on top to synthesize the different perspectives from each fault model into an overall assessment of the situation and point to the true root cause.

According to various embodiments, when a fault or opportunity is identified, the IoT platform 125 provides recommendations about an optimal corrective action to take. Initially, the recommendations are based on expert knowledge that has been pre-programmed into the system by process and equipment experts. A recommendation services module presents this information in a consistent way regardless of source, and supports workflows to track, close out, and document the recommendation follow-up. According to various embodiments, the recommendation follow-up is employed to improve the overall knowledge of the system over time as existing recommendations are validated (or not) or new cause and effect relationships are learned by users and/or analytics.

According to various embodiments, the models are used to accurately predict what will occur before it occurs and interpret the status of the installed base. Thus, the IoT platform 125 enables operators to quickly initiate maintenance measures when irregularities occur. According to various embodiments, the digital twin architecture of the IoT platform 125 employs a variety of modeling techniques. According to various embodiments, the modeling techniques include, for example, rigorous models, fault detection and diagnostics (FDD), descriptive models, predictive maintenance, prescriptive maintenance, process optimization, and/or any other modeling technique.

According to various embodiments, the rigorous models are converted from process design simulation. In this manner, process design is integrated with feed conditions and production requirement. Process changes and technology improvement provide business opportunities that enable more effective maintenance schedule and deployment of resources in the context of production needs. The fault detection and diagnostics include generalized rule sets that are specified based on industry experience and domain knowledge and can be easily incorporated and used working together with equipment models. According to various embodiments, the descriptive models identifies a problem and the predictive models determines possible damage levels and maintenance options. According to various embodiments, the descriptive models include models for defining the operating windows for the edge devices 161a-161n.

Predictive maintenance includes predictive analytics models developed based on rigorous models and statistic models, such as, for example, principal component analysis (PCA) and partial least square (PLS). According to various embodiments, machine learning methods are applied to train models for fault prediction. According to various embodiments, predictive maintenance leverages FDD-based algorithms to continuously monitor individual control and equipment performance. Predictive modeling is then applied to a selected condition indicator that deteriorates in time. Prescriptive maintenance includes determining an optimal maintenance option and when it should be performed based on actual conditions rather than time-based maintenance schedule. According to various embodiments, prescriptive analysis selects the right solution based on the company's capital, operational, and/or other requirements. Process optimization is determining optimal conditions via adjusting set-points and schedules. The optimized set-points and schedules can be communicated directly to the underlying controllers, which enables automated closing of the loop from analytics to control.

The data insight layer 220 includes one or more components for time series databases (TDSB), relational/document databases, data lakes, blob, files, images, and videos, and/or an API for data query. According to various embodiments, when raw data is received at the IoT platform 125, the raw data is stored as time series tags or events in warm storage (e.g., in a TSDB) to support interactive queries and to cold storage for archive purposes. According to various embodiments, data is sent to the data lakes for offline analytics development. According to various embodiments, the data pipeline layer 215 accesses the data stored in the databases of the data insight layer 220 to perform analytics, as detailed above.

The application services layer 225 includes one or more components for rules engines, workflow/notifications, KPI framework, insights (e.g., actionable insights), decisions, recommendations, machine learning, and/or an API for application services. The application services layer 225 enables building of applications 146*a*-*d*. The applications layer 230 includes one or more applications 146*a*-*d* of the IoT platform 125. For example, according to various embodiments, the applications 146*a*-*d* includes a buildings application 146*a*, a plants application 146*b*, an aero application 146*c*, and other enterprise applications 146*d*. According to various embodiments, the applications 146 includes general applications 146 for portfolio management, asset management, autonomous control, and/or any other custom applications. According to various embodiments, portfolio management includes the KPI framework and a flexible user interface (UI) builder. According to various embodiments, asset management includes asset performance and asset health. According to various embodiments, autonomous control includes energy optimization and/or predictive maintenance. As detailed above, according to various embodiments, the general applications 146 is extensible such that each application 146 is configurable for the different types of enterprises 160*a*-160*n* (e.g., buildings application 146*a*, plants application 146*b*, aero application 146*c*, and other enterprise applications 146*d*).

The applications layer 230 also enables visualization of performance of the enterprise 160*a*-160*n*. For example, dashboards provide a high-level overview with drill downs to support deeper investigations. Recommendation summaries give users prioritized actions to address current or potential issues and opportunities. Data analysis tools support ad hoc data exploration to assist in troubleshooting and process improvement.

The core services layer 235 includes one or more services of the IoT platform 125. According to various embodiments, the core services layer 235 include data visualization, data analytics tools, security, scaling, and monitoring. According to various embodiments, the core services layer 235 also include services for tenant provisioning, single login/common portal, self-service admin, UI library/UI tiles, identity/access/entitlements, logging/monitoring, usage metering, API gateway/dev portal, and the IoT platform 125 streams.

Figure 3:
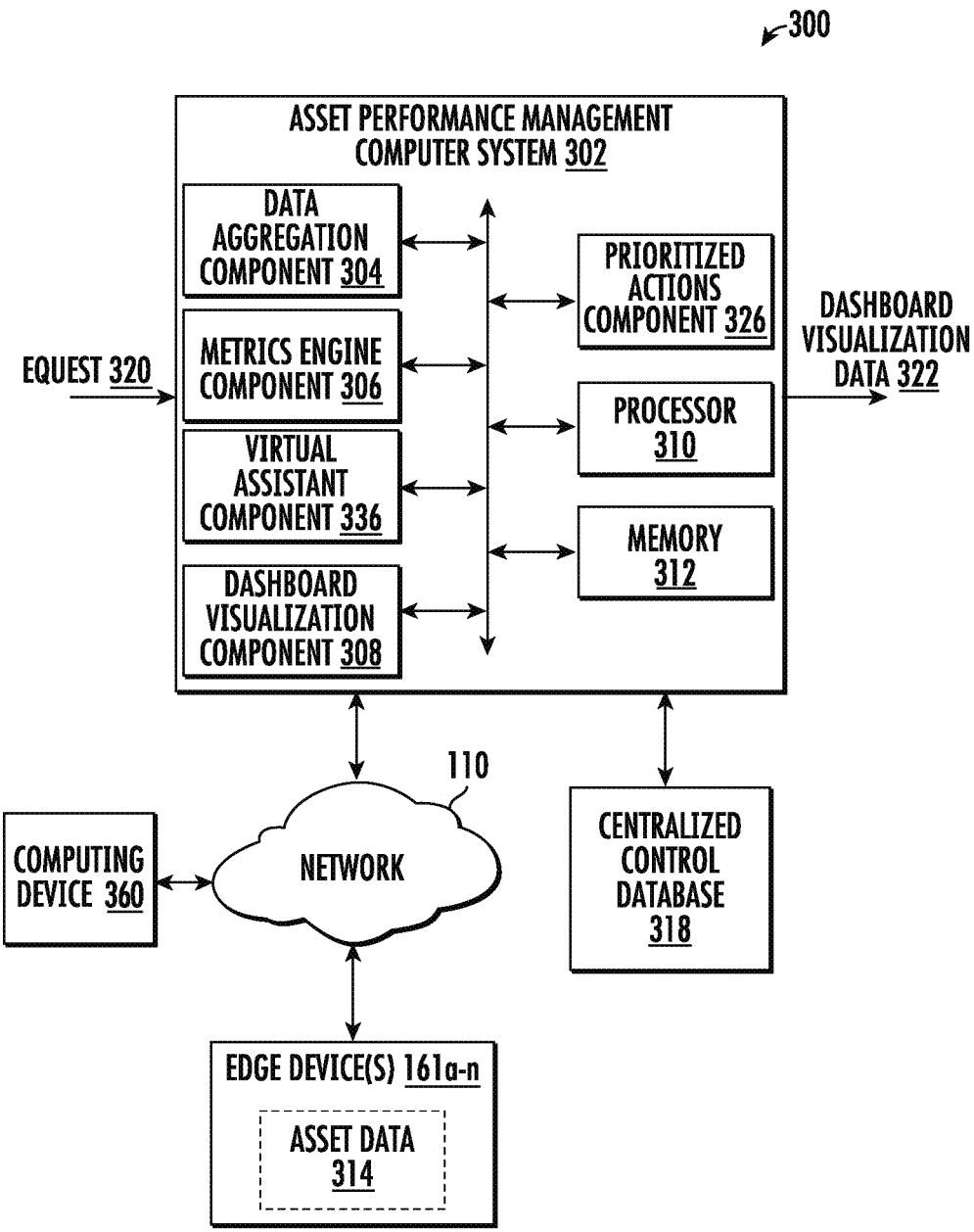
FIG. 3 illustrates a system that provides an exemplary environment, in accordance with one or more embodiments described herein.

FIG. 3 illustrates a system 300 that provides an exemplary environment according to one or more described features of one or more embodiments of the disclosure. According to an embodiment, the system 300 includes an asset performance management computer system 302 to facilitate a practical application of data analytics technology and/or digital transformation technology to provide optimization related to enterprise performance management. In one or more embodiments, the asset performance management computer system 302 facilitates a practical application of metrics modeling and/or dynamic cache storage related to dashboard technology to provide optimization related to enterprise performance management. In one or more embodiments, the asset performance management computer system 302 stores and/or analyzes data that is aggregated from one or more assets and/or one or more data sources associated with an enterprise system (e.g., a building system, an industrial system or another type of enterprise system). In one or more embodiments, the asset performance management computer system 302 facilitates a practical application of a virtual assistant related to dashboard technology to provide optimization related to enterprise performance management. In one or more embodiments, the asset performance management computer system 302 employs artificial intelligence to provide the practical application of a virtual assistant related to dashboard technology to provide optimization related to enterprise performance management.

In an embodiment, the asset performance management computer system 302 is a server system (e.g., a server device) that facilitates a data analytics platform between one or more computing devices, one or more data sources, and/or one or more assets. In one or more embodiments, the asset performance management computer system 302 is a device with one or more processors and a memory. In one or more embodiments, the asset performance management computer system 302 is a computer system from the computer systems 120. For example, in one or more embodiments, the asset performance management computer system 302 is implemented via the cloud 105. The asset performance management computer system 302 is also related to one or more technologies, such as, for example, enterprise technologies, connected building technologies, industrial technologies, Internet of Things (IoT) technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, supply chain analytics technologies, aircraft technologies, industrial technologies, cybersecurity technologies, navigation technologies, asset visualization technologies, oil and gas technologies, petrochemical technologies, refinery technologies, process plant technologies, procurement technologies, and/or one or more other technologies.

Moreover, the asset performance management computer system 302 provides an improvement to one or more technologies such as enterprise technologies, connected building technologies, industrial technologies, IoT technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, supply chain analytics technologies, aircraft technologies, industrial technologies, cybersecurity technologies, navigation technologies, asset visualization technologies, oil and gas technologies, petrochemical technologies, refinery technologies, process plant technologies, procurement technologies, and/or one or more other technologies. In an implementation, the asset performance management computer system 302 improves performance of a computing device. For example, in one or more embodiments, the asset performance management computer system 302 improves processing efficiency of a computing device (e.g., a server), reduces power consumption of a computing device (e.g., a server), improves quality of data provided by a computing device (e.g., a server), etc.

The asset performance management computer system 302 includes a data aggregation component 304, a metrics engine component 306, a prioritized actions component 326, a virtual assistant component 336, and/or a dashboard visualization component 308. Additionally, in one or more embodiments, the asset performance management computer system 302 includes a processor 310 and/or a memory 312. In certain embodiments, one or more aspects of the asset performance management computer system 302 (and/or other systems, apparatuses and/or processes disclosed herein) constitute executable instructions embodied within a computer-readable storage medium (e.g., the memory 312). For instance, in an embodiment, the memory 312 stores computer executable component and/or executable instructions (e.g., program instructions). Furthermore, the processor 310 facilitates execution of the computer executable components and/or the executable instructions (e.g., the program instructions). In an example embodiment, the processor 310 is configured to execute instructions stored in the memory 312 or otherwise accessible to the processor 310.

The processor 310 is a hardware entity (e.g., physically embodied in circuitry) capable of performing operations according to one or more embodiments of the disclosure. Alternatively, in an embodiment where the processor 310 is embodied as an executor of software instructions, the software instructions configure the processor 310 to perform one or more algorithms and/or operations described herein in response to the software instructions being executed. In an embodiment, the processor 310 is a single core processor, a multi-core processor, multiple processors internal to the asset performance management computer system 302, a remote processor (e.g., a processor implemented on a server), and/or a virtual machine. In certain embodiments, the processor 310 is in communication with the memory 312, the data aggregation component 304, the metrics engine component 306, the prioritized actions component 326, the virtual assistant component 336 and/or the dashboard visualization component 308 via a bus to, for example, facilitate transmission of data among the processor 310, the memory 312, the data aggregation component 304, the metrics engine component 306, the prioritized actions component 326, the virtual assistant component 336 and/or the dashboard visualization component 308. The processor 310 may be embodied in a number of different ways and, in certain embodiments, includes one or more processing devices configured to perform independently. Additionally or alternatively, in one or more embodiments, the processor 310 includes one or more processors configured in tandem via a bus to enable independent execution of instructions, pipelining of data, and/or multi-thread execution of instructions.

The memory 312 is non-transitory and includes, for example, one or more volatile memories and/or one or more non-volatile memories. In other words, in one or more embodiments, the memory 312 is an electronic storage device (e.g., a computer-readable storage medium). The memory 312 is configured to store information, data, content, one or more applications, one or more instructions, or the like, to enable the asset performance management computer system 302 to carry out various functions in accordance with one or more embodiments disclosed herein. As used herein in this disclosure, the term "component," "system," and the like, is a computer-related entity. For instance, "a component," "a system," and the like disclosed herein is either hardware, software, or a combination of hardware and software. As an example, a component is, but is not limited to, a process executed on a processor, a processor, circuitry, an executable component, a thread of instructions, a program, and/or a computer entity.

In an embodiment, the asset performance management computer system 302 (e.g., the data aggregation component 304 of the asset performance management computer system 302) receives asset data 314 from the edge devices 161a-161n. In one or more embodiments, the edge devices 161a-161n are associated with a portfolio of assets. For instance, in one or more embodiments, the edge devices 161a-161n include one or more assets in a portfolio of assets. The edge devices 161a-161n include, in one or more embodiments, one or more databases, one or more assets (e.g., one or more building assets, one or more industrial assets, etc.), one or more IoT devices (e.g., one or more industrial IoT devices), one or more connected building assets, one or more sensors, one or more actuators, one or more processors, one or more computers, one or more valves, one or more pumps (e.g., one or more centrifugal pumps, etc.), one or more motors, one or more compressors, one or more turbines, one or more ducts, one or more heaters, one or more chillers, one or more coolers, one or more boilers, one or more furnaces, one or more heat exchangers, one or more fans, one or more blowers, one or more conveyor belts, one or more vehicle components, one or more cameras, one or more displays, one or more security components, one or more HVAC components, industrial equipment, factory equipment, and/or one or more other devices that are connected to the network 110 for collecting, sending, and/or receiving information. In one or more embodiments, the edge device 161a-161n include, or is otherwise in communication with, one or more controllers for selectively controlling a respective edge device 161a-161n and/or for sending/receiving information between the edge devices 161a-161n and the asset performance management computer system 302 via the network 110. The asset data 314 includes, for example, industrial data, connected building data, sensor data, real-time data, historical data, event data, process data, location data, and/or other data associated with the edge devices 161a-161n.

In certain embodiments, at least one edge device from the edge devices 161a-161n incorporates encryption capabilities to facilitate encryption of one or more portions of the asset data 314. Additionally, in one or more embodiments, the asset performance management computer system 302 (e.g., the data aggregation component 304 of the asset performance management computer system 302) receives the asset data 314 via the network 110. In one or more embodiments, the network 110 is a Wi-Fi network, a Near Field Communications (NFC) network, a Worldwide Interoperability for Microwave Access (WiMAX) network, a personal area network (PAN), a short-range wireless network (e.g., a Bluetooth® network), an infrared wireless (e.g., IrDA) network, an ultra-wideband (UWB) network, an induction wireless transmission network, and/or another type of network. In one or more embodiments, the edge devices 161a-161n are associated with an industrial environment (e.g., a plant, etc.). Additionally or alternatively, in one or more embodiments, the edge devices 161a-161n are associated with components of the edge 115 such as, for example, one or more enterprises 160a-160n.

In one or more embodiments, the data aggregation component 304 aggregates the asset data 314 from the edge devices 161a-161n. For instance, in one or more embodiments, the data aggregation component 304 aggregates the asset data 314 into a centralized control database 318 configured as a database structure. The centralized control database 318 is a cache memory (e.g., a dynamic cache) that dynamically stores the asset data 314 based on interval of time and/or asset hierarchy level. For instance, in one or more embodiments, the centralized control database 318 stores the asset data 314 for one or more intervals of time (e.g., 1 minute to 12 minutes, 1 hour to 24 hours, 1 day to 31 days, 1 month to 12 months, etc.) and/or for one or more asset hierarchy levels (e.g., asset level, asset zone, building level, building zone, plant level, plant zone, industrial site level, etc.). In a non-limiting embodiment, the centralized control database 318 stores the asset data 314 for a first interval of time (e.g., 1 hour to 24 hours minutes) for a first asset (e.g., a first asset hierarchy level), for a second interval of time (e.g., 1 day to 31 days) for the first asset, and for a third interval of time (e.g., 1 month to 12 months) for the first asset.

In an example embodiment, the centralized control database 318 stores the asset data 314 for the first interval of time (e.g., 1 hour to 24 hours minutes) for all assets in a connected building (e.g., a second asset hierarchy level), for the second interval of time (e.g., 1 day to 31 days) for all the assets in the connected building, and for the third interval of time (e.g., 1 month to 12 months) for the all the assets in the connected building. In the example embodiment, the centralized control database 318 also stores the asset data 314 for the first interval of time (e.g., 1 hour to 24 hours minutes) for all connected buildings within a particular geographic region (e.g., a third asset hierarchy level), for the second interval of time (e.g., 1 day to 31 days) for all connected buildings within the particular geographic region, and for the third interval of time (e.g., 1 month to 12 months) for all connected buildings within the particular geographic region.

In another example embodiment, the centralized control database 318 stores the asset data 314 for the first interval of time (e.g., 1 hour to 24 hours minutes) for all assets in a plant (e.g., a second asset hierarchy level), for the second interval of time (e.g., 1 day to 31 days) for all the assets in the plant, and for the third interval of time (e.g., 1 month to 12 months) for the all the assets in the plant. In the example embodiment, the centralized control database 318 also stores the asset data 314 for the first interval of time (e.g., 1 hour to 24 hours minutes) for all plants at an industrial site (e.g., a third asset hierarchy level), for the second interval of time (e.g., 1 day to 31 days) for all plants at the industrial site, and for the third interval of time (e.g., 1 month to 12 months) for all plants at the industrial site.

In one or more embodiments, the data aggregation component 304 repeatedly updates data of the centralized control database 318 based on the asset data 314 provided by the edge devices 161a-161n during the one or more intervals of time associated with the centralized control database 318. For instance, in one or more embodiments, the data aggregation component 304 stores new data and/or modified data associated with the asset data 314. In one or more embodiments, the data aggregation component 304 repeatedly scans the edge devices 161a-161n to determine new data for storage in the centralized control database 318. In one or more embodiments, the data aggregation component 304 formats one or more portions of the asset data 314. For instance, in one or more embodiments, the data aggregation component 304 provides a formatted version of the asset data 314 to the centralized control database 318. In an embodiment, the formatted version of the asset data 314 is formatted with one or more defined formats associated with the one or more intervals of time and/or the one or more asset hierarchy levels. A defined format is, for example, a structure for data fields of the centralized control database 318. In various embodiments, the formatted version of the asset data 314 is stored in the centralized control database 318.

In one or more embodiments, the data aggregation component 304 identifies and/or groups data types associated with the asset data 314 based on the one or more intervals of time (e.g., one or more reporting intervals of time) and/or the one or more asset hierarchy levels. In one or more embodiments, the data aggregation component 304 employs batching, concatenation of the asset data 314, identification of data types, merging of the asset data 314, grouping of the asset data 314, reading of the asset data 314 and/or writing of the asset data 314 to facilitate storage of the asset data 314 within the centralized control database 318. In one or more embodiments, the data aggregation component 304 groups data from the asset data 314 based on corresponding features and/or attributes of the data. In one or more embodiments, the data aggregation component 304 groups data from the asset data 314 based on corresponding identifiers (e.g., a matching asset hierarchy level, a matching asset, a matching connected building, etc.) for the asset data 314. In one or more embodiments, the data aggregation component 304 employs one or more locality-sensitive hashing techniques to group data from the asset data 314 based on similarity scores and/or calculated distances between different data in the asset data 314.

In one or more embodiments, the data aggregation component 304 organizes the formatted version of the asset data 314 based on a time series mapping of attributes for the asset data 314. For instance, in one or more embodiments, the data aggregation component 304 employs a hierarchical data format technique to organize the formatted version of the asset data 314 in the centralized control database 318. In one or more embodiments, the centralized control database 318 dynamically stores data (e.g., one or more portions of the asset data 314) based on type of data presented via a dashboard visualization. In one or more embodiments, data (e.g., one or more portions of the asset data 314) aggregated from the edge devices 161a-161n is converted into one or more metrics (e.g., a KPI metric, a duty KPI, a duty target KPI) prior to being stored in the centralized control database 318. In one or more embodiments, a metric (e.g. a KP metrics) consists of aspect data indicative of an aspect employed in a model to map an attribute to the metric (e.g., an operating power asset type attribute is mapped to a duty aspect, etc.), aggregation data indicative of information related to aggregation across time, rollup data indicative of an aggregate metric of an asset across an asset at one level as well as across a hierarchy asset, low limit data indicative of a low-limit constant derived from a digital twin model in real-time, high limit data indicative of a high-limit constant derived from a digital twin model in real-time, target data indicative of a target constant derived from a digital twin model in real-time, custom calculation data indicative of information related to custom calculations using aggregate data across time or asset, and/or other data related to the metric.

In one or more embodiments, the asset performance management computer system 302 (e.g., the prioritized actions component 326 of the asset performance management computer system 302) receives a request 320. In an embodiment, the request 320 is a request to generate a dashboard visualization associated with a portfolio of assets. For instance, in one or more embodiments, the request 320 is a request to generate a dashboard visualization associated with the edge devices 161*a*-161*n* (e.g., the edge devices 161*a*-161*n* included in a portfolio of assets).

In one or more embodiments, the request 320 includes one or more asset descriptors that describe one or more assets in the portfolio of assets. For instance, in one or more embodiments, the request 320 includes one or more asset descriptors that describe the edge devices 161*a*-161*n*. An asset descriptor includes, for example, an asset name, an asset identifier, an asset level and/or other information associated with an asset. Additionally or alternatively, in one or more embodiments, the request 320 includes one or more user identifiers describing a user role for a user associated with access of a dashboard visualization. A user identifier includes, for example, an identifier for a user role name (e.g., a manager, an executive, a maintenance engineer, a process engineer, etc.). Additionally or alternatively, in one or more embodiments, the request 320 includes one or more metrics context identifiers describing context for the metrics. A metrics context identifier includes, for example, an identifier for a plant performance metric, an asset performance metric, a goal (e.g., review production related to one or more assets, etc.). Additionally or alternatively, in one or more embodiments, the request 320 includes one or more time interval identifier describing an interval of time for the metrics. A time interval identifier describes, for example, an interval of time for aggregated data such as hourly, daily, monthly, yearly etc. In one or more embodiments, a time interval identifier is a reporting time identifier describing an interval of time for the metrics.

In one or more embodiments, the request 320 is a voice input. In an embodiment, the voice input includes and/or initiates a request to generate a dashboard visualization associated with the portfolio of assets. For instance, in one or more embodiments, the voice input includes and/or initiates a request to generate a dashboard visualization associated with the edge devices 161*a*-161*n* (e.g., the edge devices 161*a*-161*n* included in a portfolio of assets). In one or more embodiments, the voice input comprises voice input data associated with the request to generate the dashboard visualization. For example, in one or more embodiments, the voice input data associated with the voice input comprises one or more asset insight requests associated with the portfolio of assets. In an embodiment, the one or more asset insight requests include a phrase provided via the voice input data. In another embodiment, the one or more asset insight requests include a question provided via the voice input data. For instance, in an embodiment, a user can speak a phrase or a question via a computing device to provide the voice input data associated with the voice input.

In one or more embodiments, the voice input includes one or more attributes (e.g., asset insight attributes, a metrics context identifier, etc.) associated with the one or more asset insight requests. For instance, in one or more embodiments, the voice input includes, for example, an identifier for a plant performance metric, an asset performance metric indicator, a goal indicator, etc. In an example, for a phrase "What was the production and quality of product A?", the word "production" can be a first attribute and the word "quality" can be a second attribute. In one or more embodiments, the voice input additionally or alternatively includes one or more asset descriptors that describe one or more assets in the portfolio of assets. For instance, in one or more embodiments, the voice input additionally or alternatively includes one or more asset descriptors that describe the edge devices 161*a*-161*n*. An asset descriptor includes, for example, an asset name, an asset identifier, an asset level and/or other information associated with an asset. Additionally or alternatively, in one or more embodiments, the voice input includes the one or more user identifiers describing a user role for a user associated with access of a dashboard visualization. Additionally or alternatively, in one or more embodiments, the voice input includes time data describing a time and/or an interval of time for the metrics and/or one or more asset insights.

In one or more embodiments, in response to the request 320, the metrics engine component 306 determines one or more metrics for an asset hierarchy associated with the portfolio of assets. For instance, in one or more embodiments, the metrics engine component 306 determines one or more metrics for an asset hierarchy associated with the edge devices 161*a*-161*n* in response to the request 320. In one or more embodiments, the metrics engine component 306 converts a portion of the asset data 314 into a metric for the portion of the asset data 314 and stores the metric for the portion of the asset data 314 into the centralized control database 318. In one or more embodiments, the metrics engine component 306 determines the one or more metrics for the asset hierarchy based on a model related to a time series mapping of attributes for the asset data 314. For example, in one or more embodiments, the metrics engine component 306 determines the one or more metrics for the asset hierarchy based on time series mapping of attributes for the asset data 314 with respect to the centralized control database 318.

In one or more embodiments, in response to the request 320, the prioritized actions component 326 determines prioritized actions for the portfolio of assets based on attributes for the aggregated data stored in the centralized control database 318. In an embodiment, the prioritized actions indicate which assets from the portfolio of assets should be serviced first. For example, in an embodiment, the prioritized actions indicate a first asset from the portfolio of assets that should be serviced first, a second asset from the portfolio of assets that should be serviced second, a third asset from the portfolio of assets that should be serviced third, etc. In one or more embodiments, the prioritized actions is a list of prioritized actions for the portfolio of assets based on impact to the portfolio. For instance, in one or more embodiments, the prioritized actions component 326 ranks, based on impact of respective prioritized actions with respect to the portfolio of assets, the prioritized actions to generate the list of the prioritized actions. In one or more embodiments, the prioritized actions component 326 groups the prioritized actions for the portfolio of assets based on relationships, features, and/or attributes between the aggregated data. In one or more embodiments, the prioritized actions component 326 determines the prioritized actions for the portfolio of assets based on a digital twin model associated with one or more assets from the portfolio of assets. Additionally or alternatively, in one or more embodiments, the prioritized actions component 326 determines the prioritized actions for the portfolio of assets based on a digital twin model associated with an operator identity associated with one or more assets from the portfolio of assets.

In one or more embodiments, the prioritized actions component 326 determines the list of the prioritized actions for the portfolio of assets based on metrics associated with the aggregated data. In certain embodiments, in response to the request 320, the prioritized actions component 326 determines one or more metrics for an asset hierarchy associated with the portfolio of assets. For instance, in one or more embodiments, the prioritized actions component 326 determines one or more metrics for an asset hierarchy associated with the edge devices 161a-161n in response to the request 320. In one or more embodiments, the prioritized actions component 326 converts a portion of the asset data 314 into a metric for the portion of the asset data 314 and stores the metric for the portion of the asset data 314 into the centralized control database 318. In one or more embodiments, the prioritized actions component 326 determines the one or more metrics for the asset hierarchy based on a model related to a time series mapping of attributes, features, and/or relationships for the asset data 314. For example, in one or more embodiments, the prioritized actions component 326 determines the one or more metrics for the asset hierarchy based on time series mapping of attributes, features, and/or relationships for the asset data 314 with respect to the centralized control database 318.

In one or more embodiments, in response to the request 320, the virtual assistant component 336 performs a natural language query with respect to the voice input data to obtain the one or more attributes associated with the one or more asset insight requests. For example, in one or more embodiments, the virtual assistant component 336 performs natural language processing with respect to the voice input data to obtain the one or more attributes associated with the one or more asset insight requests. In one or more embodiments, the virtual assistant component 336 converts the voice input data into a text string such that the text string associated with one or more textual elements. In one or more embodiments, the virtual assistant component 336 employs natural language processing (e.g., one or more natural language processing techniques) to determine textual data associated with the voice input data. In one or more embodiments, the virtual assistant component 336 queries a natural language database based on the voice input to determine the one or more attributes associated with the one or more asset insight requests. In one or more embodiments, the virtual assistant component 336 provides the one or more attributes, one or more tags, one or more labels, one or more classifications, and/or one or more other inferences with respect to the voice input data. For example, in one or more embodiments, the virtual assistant component 336 performs part-of-speech tagging with respect to the voice input data to obtain the one or more attributes, one or more tags, one or more labels, one or more classifications, and/or one or more other inferences with respect to the voice input data. In one or more embodiments, the virtual assistant component 336 performs one or more natural language processing queries with respect to the centralized control database 318 based on the one or more tags, the one or more labels, the one or more classifications, the one or more attributes, and/or the one or more other inferences with respect to the voice input data.

In one or more embodiments, the virtual assistant component 336 employs one or more machine learning techniques to facilitate determination of the one or more attributes, the one or more tags, the one or more labels, the one or more classifications, and/or the one or more other inferences with respect to the voice input data. For instance, in one or more embodiments, the virtual assistant component 336 performs a fuzzy matching technique with respect to the voice input data to determine the one or more attributes associated with the one or more asset insight requests. Additionally or alternatively, in one or more embodiments, the virtual assistant component 336 provides the voice input data to a neural network model configured for determining the one or more attributes associated with the one or more asset insight requests.

In one or more embodiments, the virtual assistant component 336 obtains aggregated data associated with the portfolio of assets based on the one or more attributes, the one or more labels, the one or more tags, the one or more classifications, /or the one or more other inferences with respect to the voice input data. Additionally, in one or more embodiments, the virtual assistant component 336 determines one or more asset insights for the portfolio of assets based on the aggregated data. In one or more embodiments, the virtual assistant component 336 groups, based on the one or more attributes, the aggregated data based on one or more relationships between assets from the portfolio of assets. In one or more embodiments, the virtual assistant component 336 applies the one or more attributes to at least a first model associated with a first type of asset insight and a second model associated with a second type of asset insight. In one or more embodiments, the virtual assistant component 336 aggregates first output data from the first model and second output data from the second model to determine at least a portion of the aggregated data. In one or more embodiments, in response to the voice input, the virtual assistant component 336 determines prioritized actions for the portfolio of assets based on the one or more attributes. In certain embodiments, in response to the voice input, the virtual assistant component 336 determines one or more metrics for an asset hierarchy associated with the portfolio of assets. For instance, in one or more embodiments, the virtual assistant component 336 determines one or more metrics for an asset hierarchy associated with the edge devices 161a-161n in response to the voice input.

In one or more embodiments, in response to the request 320, the dashboard visualization component 308 generates dashboard visualization data 322 associated with the one or more metrics for the asset hierarchy. For instance, in one or more embodiments, the dashboard visualization component 308 provides the dashboard visualization to an electronic interface of a computing device based on the dashboard visualization data 322. In one or more embodiments, the dashboard visualization data 322 and/or the dashboard visualization associated with the dashboard visualization data 322 includes the metrics for an asset hierarchy associated with the portfolio of assets. In one or more embodiments, in response to the request 320, the dashboard visualization component 308 associates aspects of the asset data 314 and/or metrics associated with the asset data 314 stored in the centralized control database 318 to provide the one or more metrics. For example, in one or more embodiment, in response to the voice input, the dashboard visualization component 308 associates aspects of the asset data 314 and/or metrics associated with the asset data 314 stored in the centralized control database 318 to provide the one or more metrics. In an aspect, the dashboard visualization component 308 determines the aspects of the asset data 314 and/or metrics associated with the asset data 314 stored in the centralized control database 318 based on the time series structure and/or the hierarchy structure of asset level of the centralized control database 318.

In one or more embodiments, the dashboard visualization data 322 and/or the dashboard visualization associated with the dashboard visualization data 322 includes the prioritized actions for the portfolio of assets. In one or more embodiments, the dashboard visualization data 322 and/or the dashboard visualization associated with the dashboard visualization data 322 includes the list of the prioritized actions. In one or more embodiments, the dashboard visualization data 322 and/or the dashboard visualization associated with the dashboard visualization data 322 includes the grouping of the prioritized actions for the portfolio of assets. In one or more embodiments, the dashboard visualization data 322 and/or the dashboard visualization associated with the dashboard visualization data 322 includes the metrics for an asset hierarchy associated with the portfolio of assets.

In one or more embodiments, in response to the voice input, the dashboard visualization component 308 generates the dashboard visualization data 322 associated with the one or more metrics for the asset hierarchy. In one or more embodiments, the dashboard visualization data 322 and/or the dashboard visualization associated with the dashboard visualization data 322 is configured based on the one or more attributes associated with the voice input. In one or more embodiments, the dashboard visualization data 322 and/or the dashboard visualization associated with the dashboard visualization data 322 includes a dashboard visualization element configured to present sensor data related to the portfolio of assets, a dashboard visualization element configured to present control data related to the portfolio of assets, a dashboard visualization element configured to present labor management data related to the portfolio of assets, a dashboard visualization element configured to present warehouse execution data related to the portfolio of assets, a dashboard visualization element configured to present inventory data related to the portfolio of assets, a dashboard visualization element configured to present warehouse management data related to the portfolio of assets, a dashboard visualization element configured to present machine control data related to the portfolio of assets, and/or one or more other dashboard visualization elements associated with the one or more asset insights.

Additionally, in one or more embodiments, the dashboard visualization component 308 performs one or more actions based on the metrics. For instance, in one or more embodiments, the dashboard visualization component 308 generates dashboard visualization data 322 associated with the one or more actions. In an embodiment, an action includes generating a user-interactive electronic interface that renders a visual representation of the one or more metrics. In another embodiment, an action from the one or more actions includes transmitting, to a computing device, one or more notifications associated with the one or more metrics. In another embodiment, an action from the one or more actions includes providing for and/or optimizing one or more process conditions for an asset associated with the asset data 314. For example, in another embodiment, an action from the one or more actions includes adjusting a set-point and/or a schedule for an asset associated with the asset data 314. In another embodiment, an action from the one or more actions includes one or more corrective actions to take for an asset associated with the asset data 314. In another embodiment, an action from the one or more actions includes providing an optimal maintenance option for an asset associated with the asset data 314. In another embodiment, an action from the one or more actions includes an action associated with the application services layer 225, the applications layer 230, and/or the core services layer 235. The actions may be presented to a user of the system for selection and the decision to take action may be made by the user and/or the action may be automatically taken by the system. For example, the system may automatically optimize one or more process conditions for one or more assets associated with the portfolio of assets based on the aggregated data.

Additionally, in one or more embodiments, the dashboard visualization component 308 performs one or more actions based on the prioritized actions for the portfolio of assets. In an embodiment, an action includes generating a user-interactive electronic interface that renders a visual representation of the prioritized actions for the portfolio of assets and/or the one or more metrics. In another embodiment, an action from the one or more actions includes transmitting, to a computing device, one or more notifications associated with the prioritized actions for the portfolio of assets and/or the one or more metrics. In one or more embodiments, the dashboard visualization data 322 and/or the dashboard visualization associated with the dashboard visualization data 322 configures the dashboard visualization for remote control of one or more assets from the portfolio of assets based on the one or more attributes associated with the voice input. In one or more embodiments, the dashboard visualization data 322 and/or the dashboard visualization associated with the dashboard visualization data 322 configures a three-dimensional (3D) model of an asset from the portfolio of assets for the dashboard visualization based on the one or more attributes associated with the voice input (e.g., the voice input associated with the request 320). In one or more embodiments, the dashboard visualization data 322 and/or the dashboard visualization associated with the dashboard visualization data 322 filters one or more events associated with the asset related to the 3D model based on the one or more attributes associated with the voice input. In one or more embodiments, the dashboard visualization data 322 and/or the dashboard visualization associated with the dashboard visualization data 322 configures the dashboard visualization for real-time collaboration between two or more computing devices based on the one or more attributes associated with the voice input.

The system 300 may be configured to interact with or include a computing device 360. For example, the system 300 may communicatively couple with the computing device 360 via the network 110. The computing device 360 may be a mobile computing device, a smartphone, a tablet computer, a mobile computer, a desktop computer, a laptop computer, a workstation computer, a wearable device, a virtual reality device, an augmented reality device, or another type of computing device located remote from the asset performance management computer system 302. In one or more embodiments, the computing device 360 may generate the request 320. For example, in one or more embodiments, the request 320 may be generated via a visual display (e.g., a user interface) of the computing device 360. In one or more embodiments, the computing device 360 may generate a voice input. For example, in one or more embodiments, the voice input (e.g., the voice input associated with the request 320) is generated via one or more microphones of the computing device 360 and/or one or more microphones communicatively coupled to the computing device 360. In one or more embodiments, the computing device 360 may employ mobile computing, augmented reality, cloud-based computing, IoT technology and/or one or more other technologies to provide performance data, video, audio, text, graphs, charts, real-time data, graphical data, one or more communications, one or more messages, one or more notifications, and/or other media data associated with the one or more metrics. The computing device 360 includes mechanical components, electrical components, hardware components and/or software components to facilitate determining prioritized actions and/or one or more metrics associated with the asset data 314.

Figure 4:
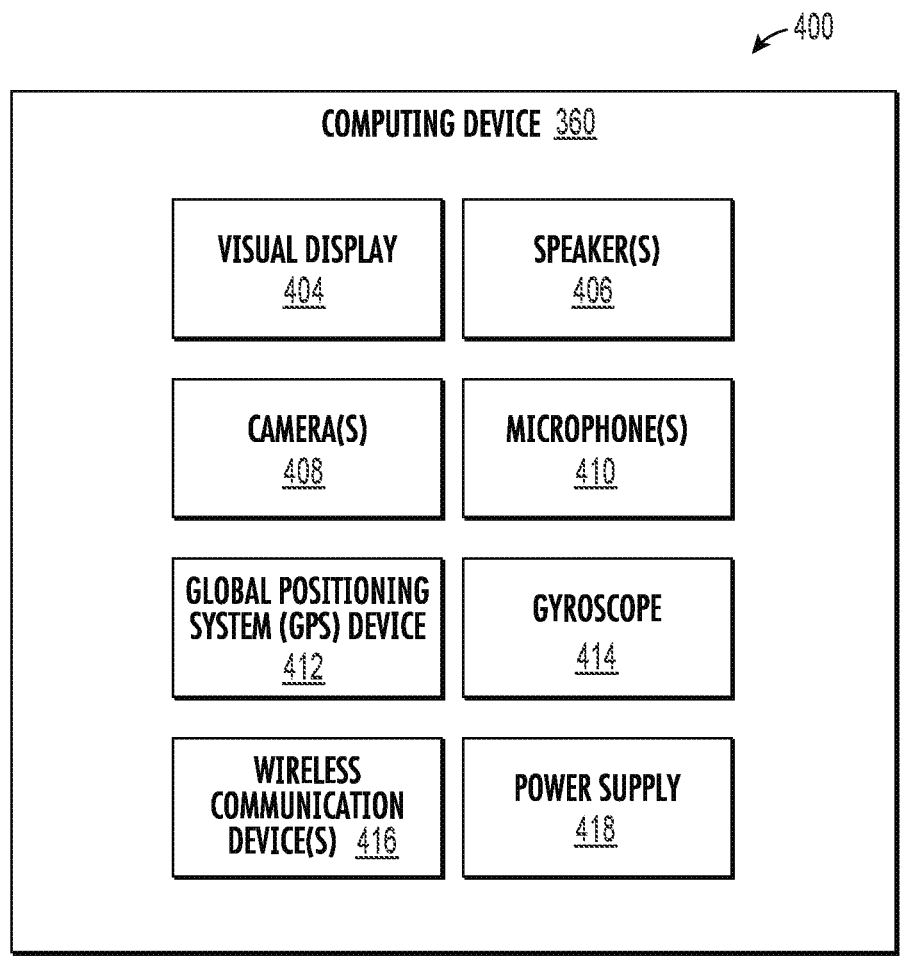
FIG. 4 illustrates an exemplary computing device, in accordance with one or more embodiments described herein.

Referring to FIG. 4, the computing device 360 is shown in greater detail. The computing device 360 may include a visual display 404, one or more speakers 406, one or more cameras 408, one or more microphones 410, a global positioning system (GPS) device 412, a gyroscope 414, one or more wireless communication devices 416, and/or a power supply 418.

In an embodiment, the visual display 404 is a display that facilitates presentation and/or interaction with one or more portions of the dashboard visualization data 322. In one or more embodiments, the computing device 360 displays an electronic interface (e.g., a graphical user interface) associated with an asset performance management platform. In one or more embodiments, the visual display 404 is a visual display that renders one or more interactive media elements via a set of pixels. The one or more speakers 406 include one or more integrated speakers that project audio. The one or more cameras 408 include one or more cameras that employ autofocus and/or image stabilization for photo capture and/or real-time video. The one or more microphones 410 include one or more digital microphones that employ active noise cancellation to capture audio data. In one or more embodiments, at least a portion of the voice input is generated via the one or more microphones 410. The GPS device 412 provides a geographic location for the computing device 360. The gyroscope 414 provides an orientation for the computing device 360. The one or more wireless communication devices 416 includes one or more hardware components to provide wireless communication via one or more wireless networking technologies and/or one or more short-wavelength wireless technologies. The power supply 418 is, for example, a power supply and/or a rechargeable battery that provides power to the visual display 404, the one or more speakers 406, the one or more cameras 408, the one or more microphones 410, the GPS device 412, the gyroscope 414, and/or the one or more wireless communication devices 416. In certain embodiments, the dashboard visualization data 322 associated with the one or more metrics, the prioritized actions and/or the one or more asset insights related to the portfolio of assets is presented via the visual display 404 and/or the one or more speakers 406.

Figure 5:
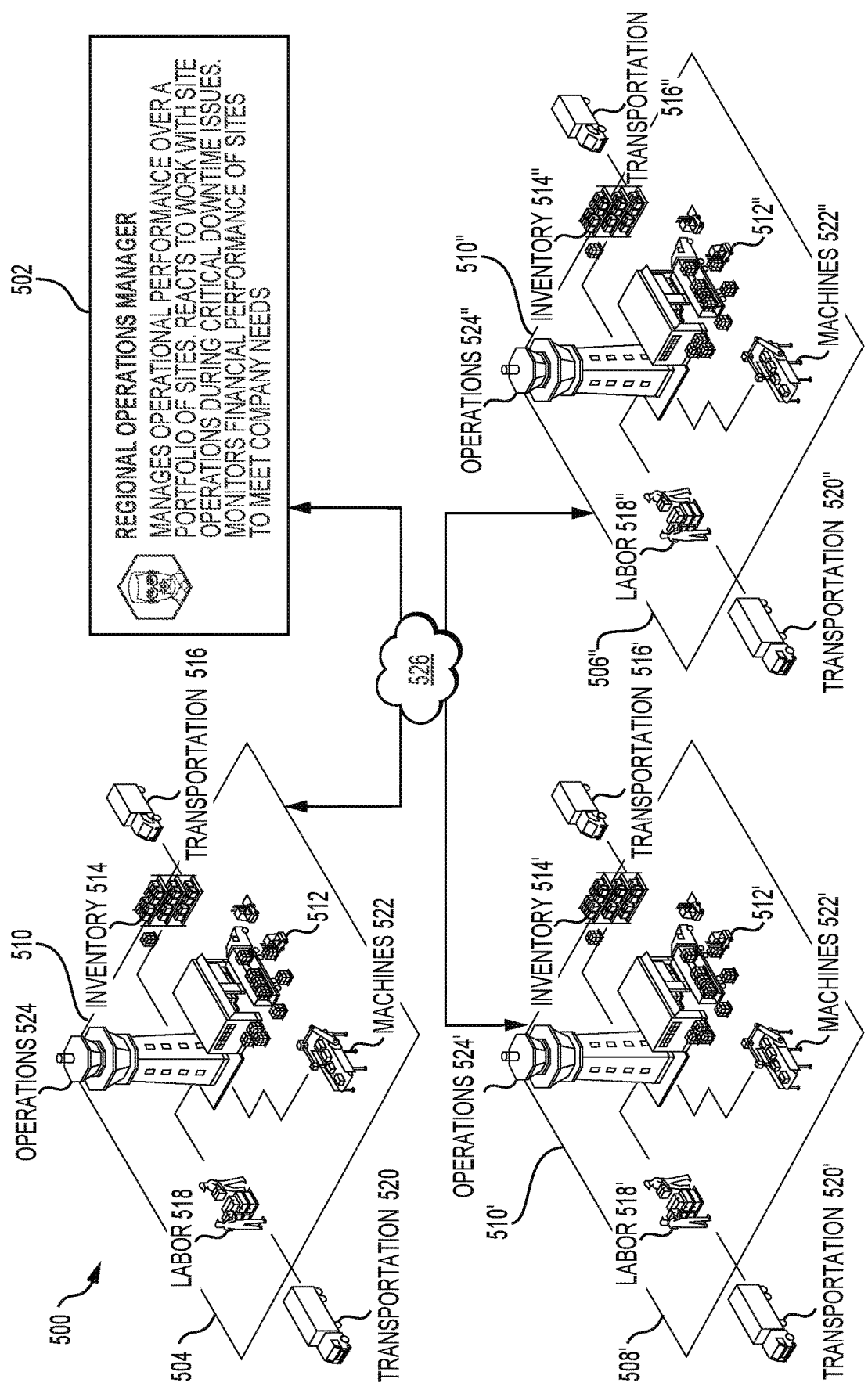
FIG. 5 is a schematic diagram illustrating exemplary warehouse environments implementing methods and systems of this disclosure.

FIG. 5 illustrates a system 500 that includes multiple exemplary warehouses and/or distribution center environments that are connected and monitored by a manager 502. The manager 502 may be a regional operations manager or a global operations manager and based on the role of the manager 502, the information displayed to the manager using the systems and devices described herein may change. The system 500 includes a first warehouse 504, a second warehouse 506, and a third warehouse 508. Each of the warehouses may include a various components including delivery transportation 516 (e.g., supply chain delivery truck) to load into inventory 514. An operational control tower 510 may monitor and/or otherwise control operations 524 within the first warehouse 504, and the second warehouse 506 and the third warehouse 508 may be substantially similar or different than the first warehouse 504. Operations 524 can be performed and/or managed by labor 518. Operations 524 can include loading 512 and assembly/sorting machines 522. Once assembled, packaged, and otherwise processed for distribution, transportation 520 (e.g., a freight truck) can be loaded by labor 518 and depart for its subsequent destination. Each of the warehouses may be configured such that worker performance is optimized by users and/or automated tools selectively scheduling and assigning tasks and worker equipment, as discussed more particularly below. The system 500 may be configured such that each of the first warehouse 504, the second warehouse 506, and the third warehouse 508 is capable of generating data regarding the optimized performance of tasks and data associated with key performance indicators (KPIs) such that the manager 502 and other users can measure the performance of each of the various warehouses as explained in greater detail below. The warehouses may be communicatively coupled with one another and the regional manager 502 via a network 526 (e.g., a cloud network).

Figure 6:
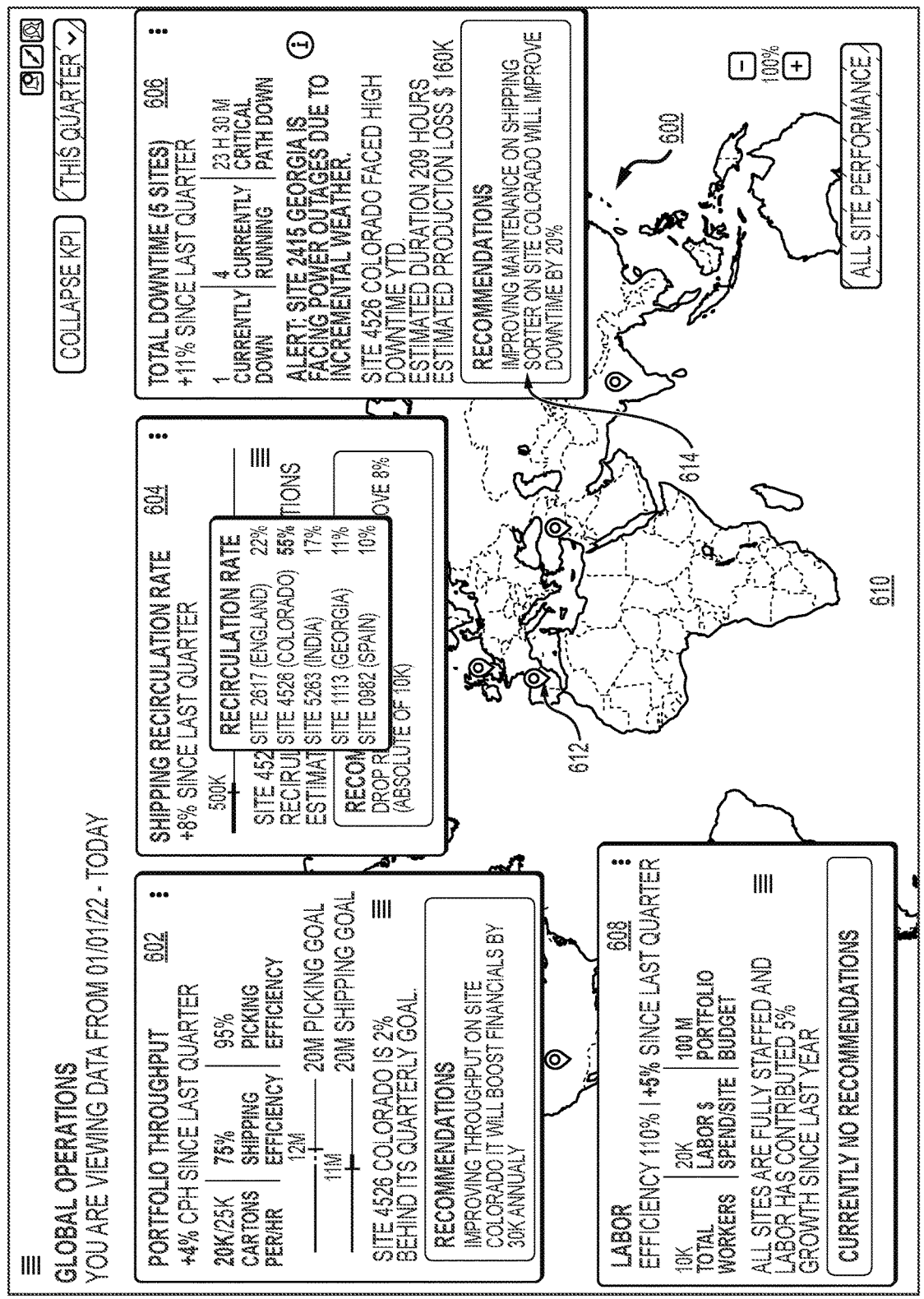
FIG. 6 illustrates an exemplary dashboard for viewing global operations in exemplary warehouses, such as those described in this disclosure.

FIG. 6 is an exemplary user interface dashboard 600 associated with one or more of the warehouses described above. The dashboard 600 displays a map 610 that includes a pin 612 at each of the warehouses where performance is tracked using the dashboard 600. The pin 612 may be color coded based on the performance of the warehouse the pin 612 represents. For example, if a warehouse is performing well, the pin associated with the warehouse represented on the dashboard 600 may be a green pin and if a warehouse is performing poorly, the pin associated with the warehouse represented on the dashboard 600 may be a red pin. The pin 612 may visually represent location information of a particular warehouse, which location information may be used to differentiate one warehouse or site from another to the regional manager or other user of the computing device 360 such that the regional manager can determine differentiating information between the various warehouses or sites.

As shown, the dashboard 600 may include one or more banners indicating KPIs associated with the warehouse, which may be selected and/or displayed based on one or more KPI descriptors. For example, the dashboard 600 may display a portfolio throughput indicator 602, a shipping recirculation rate 604, a total downtime 606 as measured across one or more sites (e.g., warehouses), and a labor performance indicator 608. This list of KPIs is not exhaustive, and in some embodiments, one or more additional or other KPIs may be tracked and reported on the dashboard. The KPIs may be based on, for example, the KPI framework developed using the edge devices 161a-161n. In some aspects, the one or more KPI indicators or other aspects of the dashboard 600 can generate and/or transmit messages and messages transmitted in or by dashboard 600, such as triggers and/or alerts, can be configured for transmitting information to remote computing systems, locations, and/or other interested users. Dashboard 600 can also be configured to detect near performance misses, trends, or other performance related events to build a trend model for early detection of anomalies before performance faults or malfunctions occur increasing worker engagement and performance.

Dashboard 600 can present regional performance summaries from processed data associated with a region or plurality of regions, including operational status as to a region or plurality of regions being below standard, on standard, above standard, etc. Other metrics and/or alerts can be presented in dashboard 600, including information related to location and metrics related thereto as to regional sites performing below, at, or above standard (e.g., a message can indicate that site(s) in a particular are performing below standard, etc.). The information presented in dashboard 600 can be presented in any number of ways, including color coded (e.g., red for site(s) which are performing below standard, green for site(s) which are performing above standard, blue for site(s) which are performing on standard, etc.)

In some aspects, a user (e.g., a regional operations manager) can toggle dashboard 600 to investigate more information related to a site, which toggled dashboard may include more real-time performance-related metrics across a period of time (e.g., a shift, a day, a week, a year, etc.). In some aspects, dashboard 600 facilitates tracking top performing sites as well as outlier poorer performance according to certain metrics. The information presented in dashboard 600 can be presented in any number of ways, including color coded similar to other previous dashboards of this disclosure.

The portfolio throughput indicator 602 may relate to a throughput of packages, materials, and goods through the respective warehouse or site. As shown, the portfolio throughput indicator 602 may provide recommendations to the manager 502. The portfolio throughput indicator 602 of the dashboard 600 includes a recommendation in textual form, but recommendations can be provided to the regional operations manager in any format, including audio. The recommendations may be based on analysis of data as recorded by the system 500 of FIG. 5 as operations occur. For example, a number of packages received and/or units assembled may be compared with a number of packages delivered for a given warehouse in light of the various operations occurring in the warehouse and the data may be recorded, analyzed, and used to make a recommendation regarding throughput to the regional operations manager. In some embodiments, the recommendation may be associated with a particular dollar amount that might be expected to be recouped given implementation of the particular recommendation. In some embodiments, the recommendation(s) may be regionally- or site-specific. In some embodiments, the recommendation(s) may be global to all regions and/or sites. The shipping recirculation rate indicator 604 may relate to the recirculation rate of shipping within the global operations of the enterprise.

The total downtime indicator 606 may relate to the amount of time that a warehouse or components thereof are shut down due to unplanned circumstances (e.g., inclement weather or other Acts of God causing manpower shortages, malfunctioning of equipment, etc.) Downtime may refer to the amount of time that an entire warehouse is down and/or portions of the warehouse with respect to the capacity of the specific warehouse for receiving and shipping goods. As shown, the total downtime indicator 206 may provide recommendations to the regional operations manager. The total downtime indicator 606 of the dashboard 600 includes a recommendation in textual form, but recommendations can be provided to the regional operations manager in any format, including audio. The recommendations may be based on analysis of data as recorded by the system 500 of FIG. 5 as operations occur. For example, a warehouse capacity and/or a component capacity may be measured and compared with a warehouse and/or component utilization time and this information may be used to make a recommendation regarding total downtime to the regional operations manager. In some embodiments, the recommendation may be associated with a particular dollar amount that might be expected to be recouped given implementation of the particular recommendation. In some embodiments, the recommendation(s) may be regionally- or site-specific. In some embodiments, the recommendation(s) may be global to all regions and/or sites. The total downtime indicator 606 may include, for example, a number of sites or warehouses that are currently running and that are not currently running. The total downtime indicator may include one or more alerts related to the reason for downtime at one or more sites. In some embodiments, the past and current total downtimes may be tracked and comparisons to previous cycles may be used to measure current performance. In some embodiments, a downtime associated with one or more critical paths may be measured and reported via the dashboard 600.

The labor performance indicator 608 may relate to worker performance and may represent data from, for example, a database associated with one or more control towers such as the control tower 510 of FIG. 5. As shown, dashboard 600 can present information related to an aggregation of overall worker utilization, which disaggregated information may include, for example, utilization from a plurality of locations within an individual warehouse (e.g., picking location, shipping location, packing location, etc.) of a job site and/or multiple job sites. Dashboard 600 can present inferences from processed data associated with the plurality of locations, including operational status as to current and planned events, total workers, labor efficiency rates (e.g., cartons per labor/min) and effective throughput metrics (e.g., cartons/worker or some other worker specific metric to measure performance). In some embodiments, the dashboard may be configured to make recommendations with respect to labor similar to the recommendations made above with respect to other performance indicators. The information presented in dashboard 600 can be presented in any number of ways, including color coded (e.g., red for events that require immediate attention, green for metrics that are in excess of an objective goal, grey for events that are neutral or within a range of compliance for an objective goal, etc.).

In some embodiments, the dashboard may be customizable based on a role of the user using the dashboard 600. For example, the information displayed and recommendations made using the dashboard 600 and other embodiments of the dashboard described herein may be tailored based on a user role for a particular user (e.g., global operations manager, regional manager, etc.) In some embodiments, the system may generate, track, obtain (in aggregate or not), and display data based on the user identifier associated with a user. Accordingly, the system may be configured to change, adapt, or customize a dashboard visualization based on the user identifier.

Still referring to FIG. 6, a recommendations visualization 614 is depicted. the recommendations visualization may present a user with one or more recommendations on the dashboard 600. One or more of the recommendations generated may be based on, for example, a list of prioritized actions based on metrics generated from the portfolio of assets at a particular location (e.g., the sensors, etc.) The dashboard 600 may display one or more recommendations based on the list of prioritized actions. Further, the system may be configured to group prioritized actions (e.g., recommendations, etc.) based on relationships between aggregated data and the dashboard 600 may be configured based on the grouping of prioritized actions. In some aspects, the system may be configured to rank prioritized actions (e.g., recommendations, etc.) based on the impact of the respective prioritized actions and may generate the list of prioritized actions based on this ranking.

Figure 7:
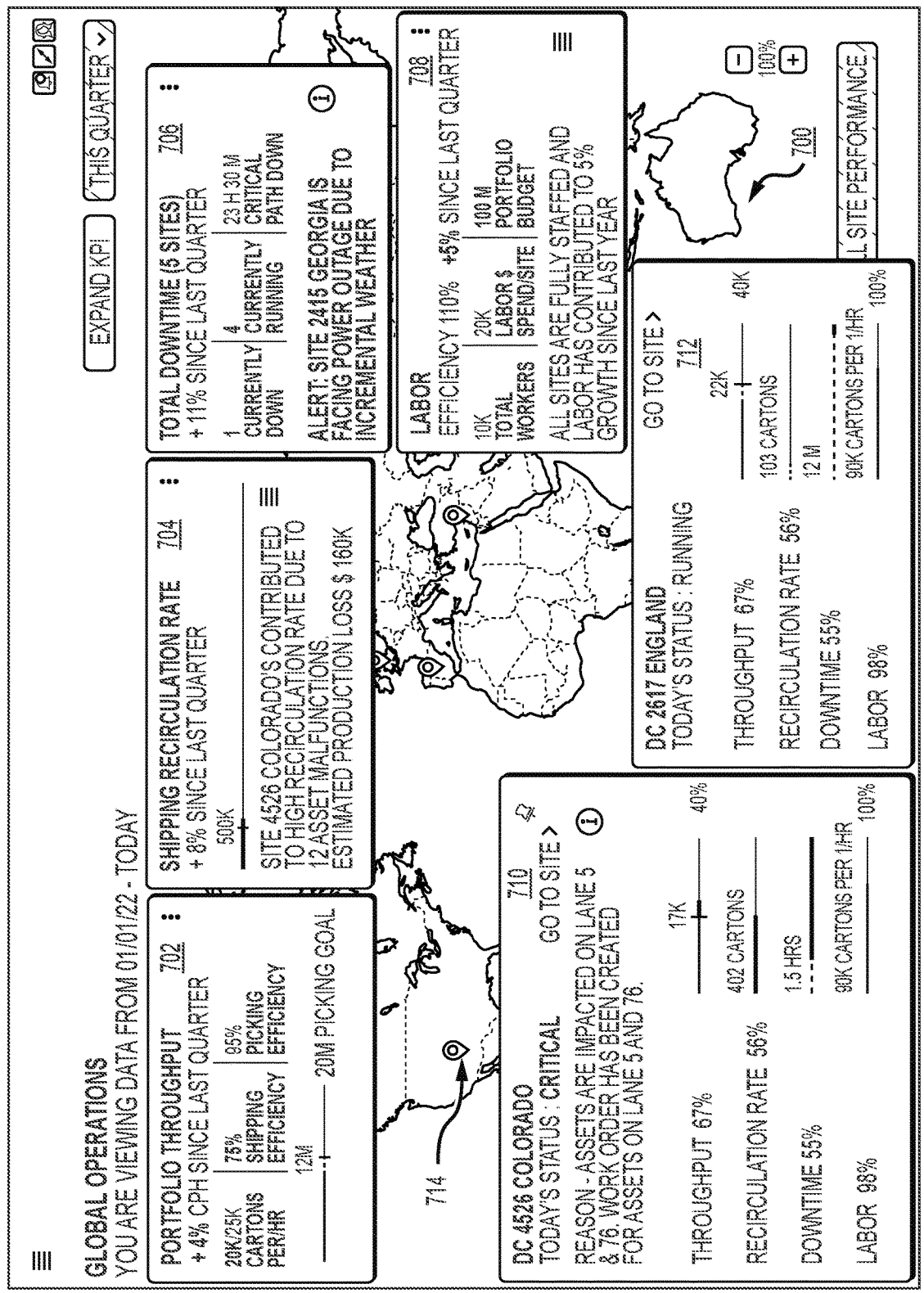
FIG. 7 illustrates additional aspects of an exemplary dashboard for viewing global operations in exemplary warehouses, such as those described in this disclosure.

FIG. 7 depicts an exemplary dashboard 700 that includes performance indicators 702-708 similar to those performance indicators discussed above with respect to FIG. 2 as well as regional operations update indicators that include information that may be specific to a particular region or site. The regional operations update indicator 710 may include information with respect to the warehouse at Colorado (as one example) as indicated by pin 714. The regional operations indicator 710 provides the regional operations manager with information including the warehouse's specific throughput, recirculation rate, downtime, and labor utilization. The regional operations update indicator can also include information specific to the current operations at the given location, such as, for example, a status indicator (e.g., "normal," "running," "critical," etc.) that gives the regional operations manager a quick update as to the status of the particular site. In some embodiments, the status of the site may be explained based on data uploaded and input from the site itself (e.g., local site operations lead, shift leads, sensors installed on equipment at the site, etc.)

Figure 8:
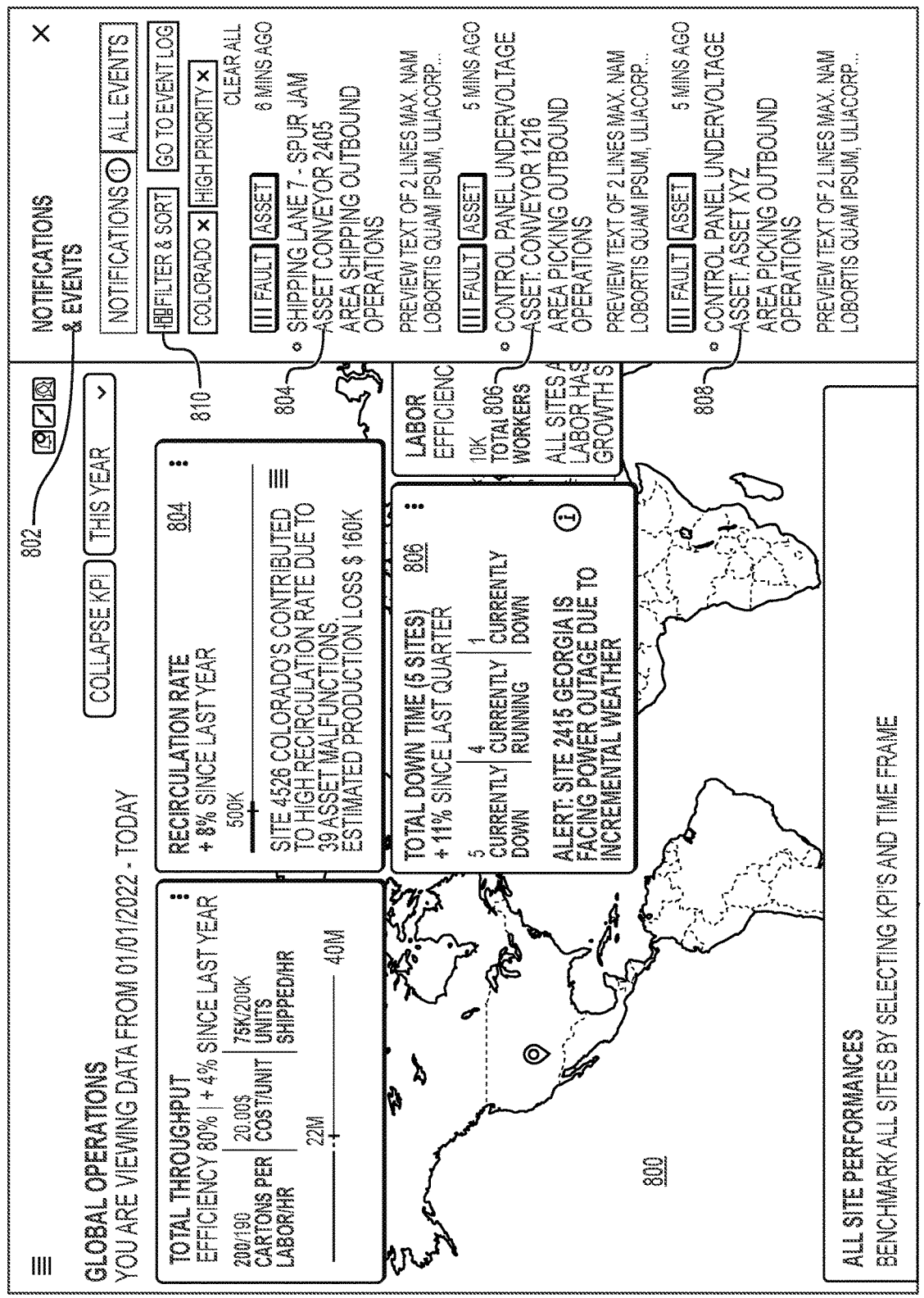
FIG. 8 illustrates additional aspects of an exemplary dashboard for viewing global operations in exemplary warehouses, such as those described in this disclosure.

Referring to FIG. 8, an aspect of the dashboard 800 is shown. The dashboard 800 includes a Notifications and Events section 802, which section may be used to provide the regional operations manager one or more notifications and/or explain one or more events at or related to the various sites to him or her. The events may be presented, for example, in an event log. The event log may describe various happenings in the warehouses which might affect productivity. For example, the event 804 may describe a shipping lane spur jam which may affect the ability for the affected shipping lane to ship outbound packages. As another example, the event log may describe equipment malfunctions, such as the event 806 describing an equipment malfunction with respect to a control panel of a conveyor (e.g., an undervoltage). The Notifications and Events section 802 may be an alerts list, which list of alerts may be associated with one or more recommendations for the warehouse and/or the portfolio of assets. The Notifications and Events section 802 may include one or more filters 810 for filtering events to show only events with a particular criteria to a user. For example, events may be filtered based on a location, a priority level, a level of malfunction, etc.

Figure 9:
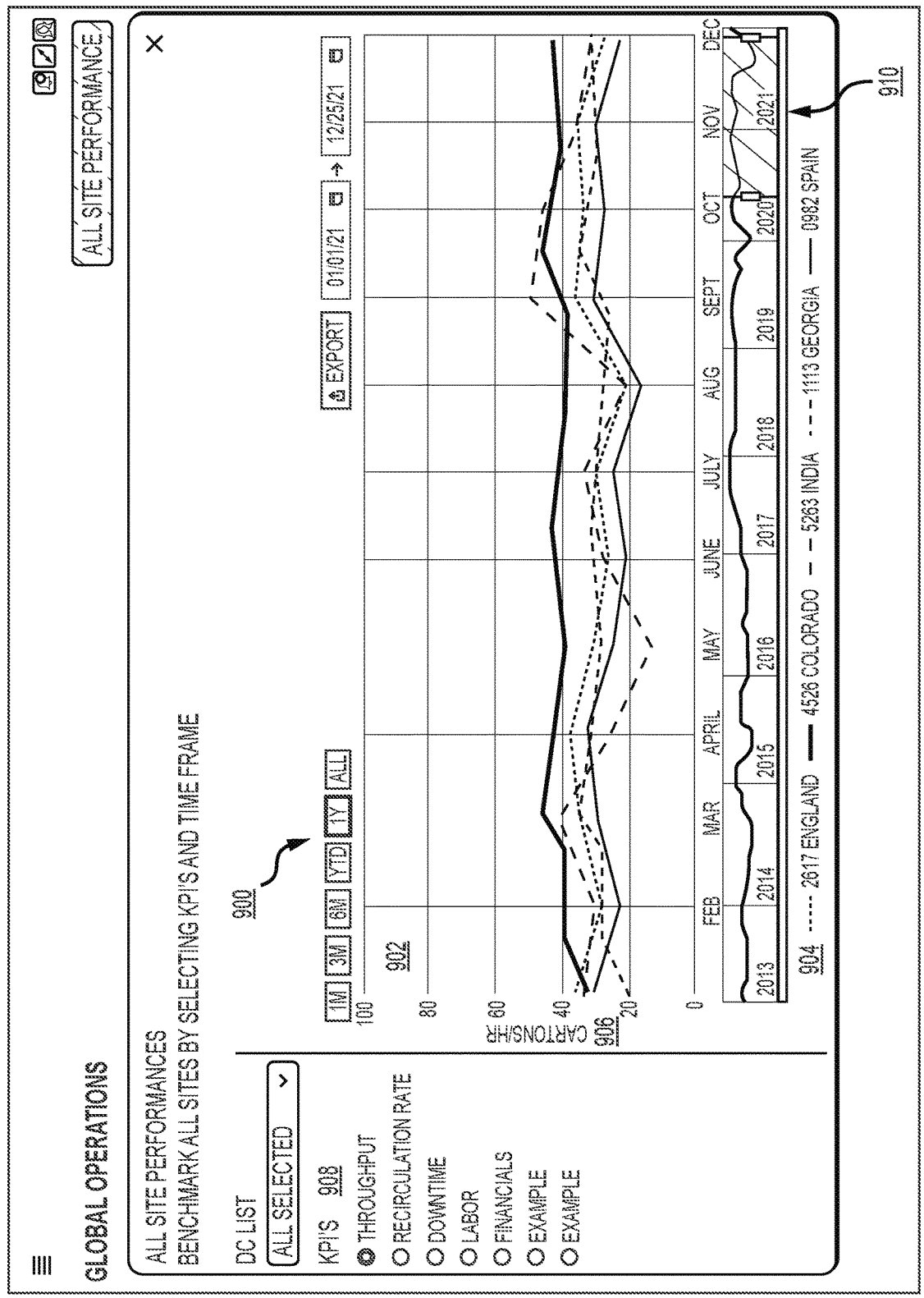
FIG. 9 illustrates an exemplary chart for tracking site performance in exemplary warehouses, such as those described in this disclosure.

Referring to FIG. 9, a site performance chart 900 is shown. The site performance chart 900 may selectively show various KPIs in order to graphically compare the various sites over time. The y-axis 906 of the chart 900 may display the KPI as determined by a KPI toggle 908. The particular KPI values may be compared against time on the x-axis 904 such that the particular indicator can be tracked over time. A selection pane 910 may enable a user to quickly select various time frames over which to display relevant data.

Figure 10:
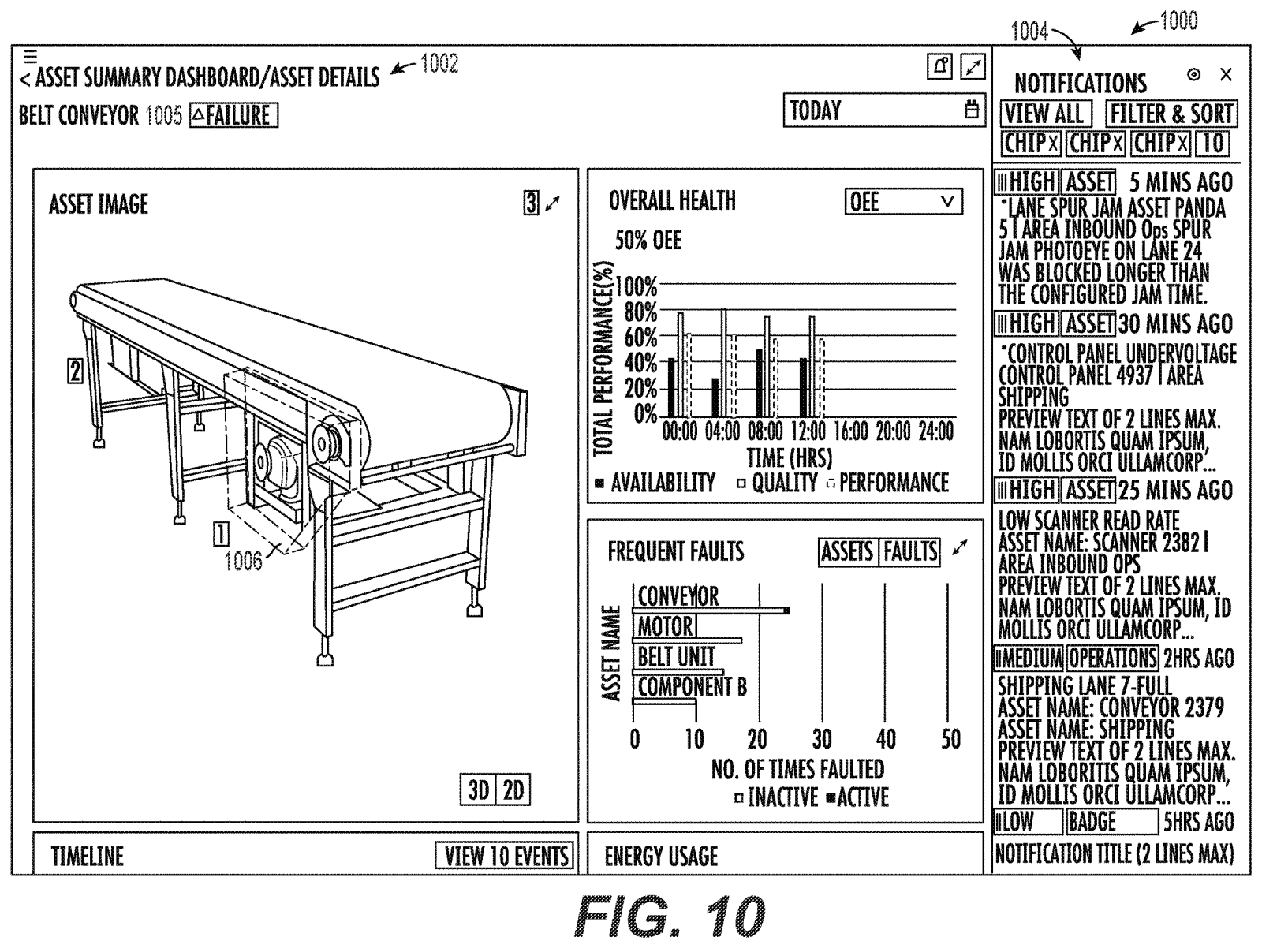

FIG. 10 illustrates an exemplary electronic interface 1000 according to one or more embodiments of the disclosure. In an embodiment, the electronic interface 1000 is an electronic interface of the computing device 360 that is presented via the visual display 404. In one or more embodiments, a dashboard visualization is presented via the electronic interface 1000. In certain embodiments, the data visualization presented via the electronic interface 1000 presents one or more asset insights 1002 and/or one or more notifications 1004 via the dashboard visualization associated with the electronic interface 1000. The asset insights 1002 and/or notifications 1004 may be related to one or more features of the warehouse system 500 of FIG. 5 (e.g., the machines 522, the labor 518, etc.) In one or more embodiments, the data visualization presented via the electronic interface 1000 includes a 3D model 1006 associated with an asset from a portfolio of assets. In one or more embodiments, one or more events associated with the 3D model 1006 can be filtered and/or information associated with the one or more events can be displayed in response to selection of one or more interactive buttons associated with the 3D model 1006.

Figure 11:
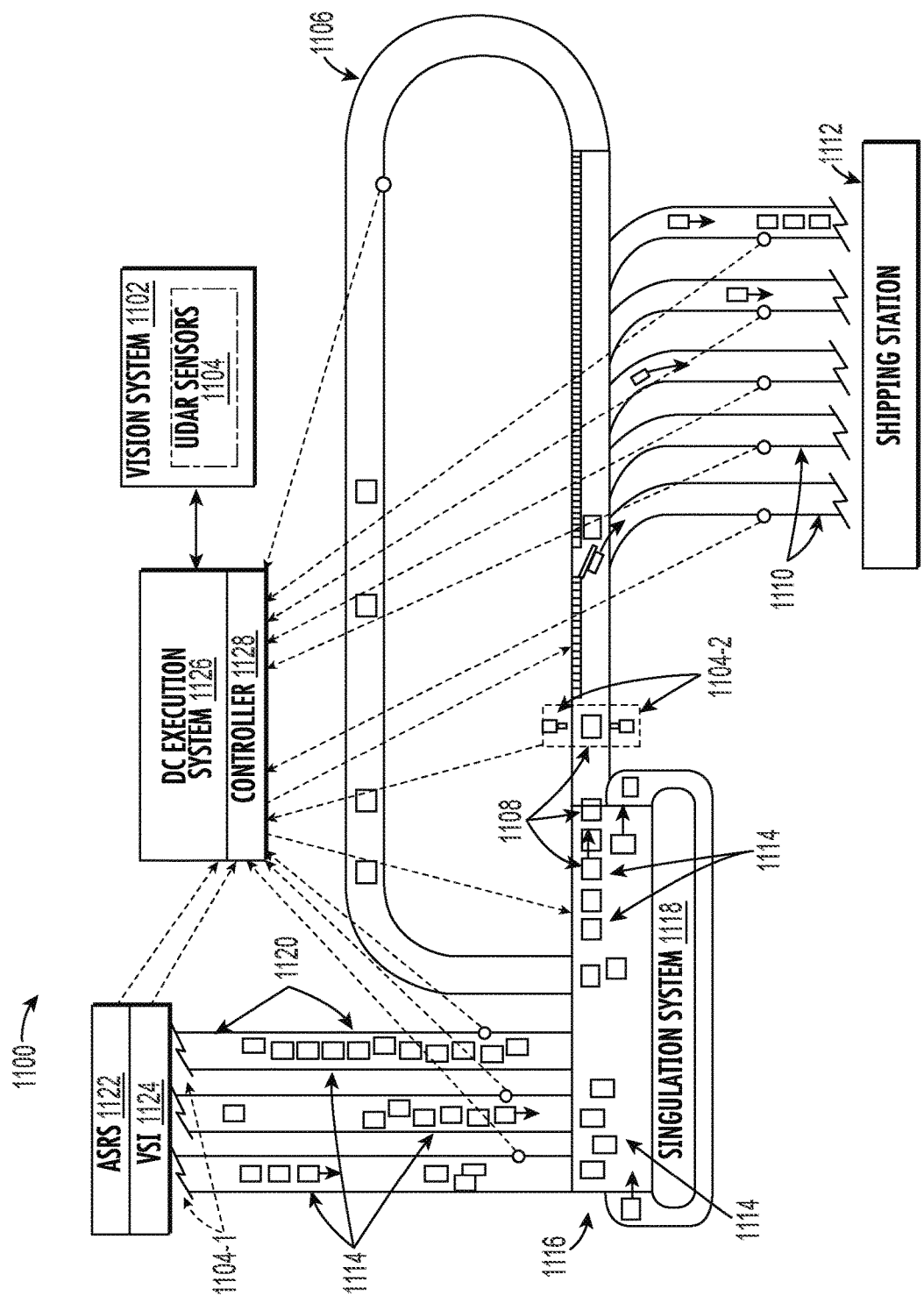
FIG. 11 illustrates a schematic view of a material handling system including LiDAR based vision system, in accordance with one or more embodiments described herein.

FIG. 11 illustrates a schematic view of a material handling system 1100, in accordance with one or more embodiments described herein. In one or more embodiments, the material handling system 1100 corresponds to an enterprise from the enterprises 160a-n. In one or more embodiments, the material handling system 1100 includes one or more assets from a portfolio of assets. The material handling system 1100 includes at least one vision system 1102 with one or more LiDAR based sensors 1104, according to an example embodiment. The material handling system 1100 may correspond to a material handling environment for example, but not limited to, a distribution center, a shipping station, a warehouse, an inventory, etc. According to some example embodiments, the material handling system 1100 includes one or more conveyors for handling various items such as, cartons, totes, shipping packages, boxes etc. As illustrated, the material handling system 1100 includes a sorter portion 1106 for selectively identifying, sorting and/or diverting one or more articles 1108 to one of the destinations 1110, such as, but not limited to, takeaway conveyors, chutes, and the like. In some examples, the diverted articles may be sent to shipping 1112 for shipping to a destination, for example, a store. While the example as shown in FIG. 11 may illustrate a paddle sorter, it is noted that the scope of the present disclosure is not limited to a paddle sorter. In some examples, the material handling system 1100 may include other types of sorter(s) may be implemented, including, but not limited to, pusher/puller sorters, pop-up transfer sorters, and/or cross-belt sorters.

Although the LiDAR sensors 1104 are illustrated to be located within the vision system 1102, however, according to various example embodiments described herein, multiple LiDAR based sensors are installed at various sections of the material handling system 1100. In other words, the LiDAR sensors 1104 may be positioned at various different sections (e.g. workstations) within the material handling system 1100. Further, in one or more embodiments, these LiDAR based sensors are communicatively coupled (e.g. remotely connected) to the vision system 1102, via a communication network (e.g. wireless or wired network).

Referring to FIG. 11, illustratively, a first LiDAR sensor unit 1104-1 is installed near an area corresponding to an automated storage and retrieval system (ASRS) 1122. Similarly, a second LiDAR sensor unit 1104-2 may be installed near another area corresponding to a singulation system along the sorter 1106. In another example, similar LiDAR based sensor units may be located at the shipping station 1112 or at various other positions (not shown) along the sorter 1106. Accordingly, the material handling system 1100 may include many more such LiDAR sensor units that are installed or mounted at various sections (e.g. dedicated zones) of a material handling environment. As stated before, in one or more embodiments, these sensor units are communicatively coupled to the vision system 1102, via the communication network. These LiDAR based sensor units may be capable of capturing a data stream (e.g. 3D data stream) representative of a 3D scan of that area where the respective LiDAR sensor unit is located. In one or more embodiments, the data stream is used by the vision system 1102 to monitor, one or more articles 1114, machines, and/or workers present in various sections of the material handling system 1100.

As illustrated, in one or more embodiments, the material handling system 1100 includes a sorter portion (e.g. the sorter 1106) that receives the one or more articles 1114 from an induction portion 1116. In some examples, the induction portion 1116 is associated with a singulation system 1118 that is configured to generate spacing between the one or more articles 1114. For example, the induction portion 1116 may comprise various mechanical components e.g. configurations of belt units and/or mechanical actuators with end effectors, which may create the required spacing between the one or more articles 1114. In accordance with some example embodiments, LiDAR based sensors of the LiDAR sensor unit 1104-2 may capture a 3D scan of various operations and/or activities that may be performed on the singulation system 1118.

In some examples, the induction portion 1116 receives articles 1114 from a merge portion 1120, as shown in FIG. 11. The merge portion 1120 may have multiple accumulation lanes and/or conveyors for releasing articles in a slug and/or zipper fashion onto the induction portion 1116. In some examples, the merge portion 1120 may receive the one or more articles 1114 from a receiving system and/or an automated storage and retrieval system (ASRS) 1122. Additionally, or alternatively, the merge portion 1120 may receive the one or more articles from other sources. In some example embodiments, the ASRS 1122 may also include a separate vision system (VS1) 1124 with one or more LiDAR based sensor units (similar to 1104-1, 1104-2) that may be installed at various locations within the ASRS 1122.

According to some example embodiments, the LiDAR sensors 1104 of the vision system 1102 are configured for scanning a target area of the material handling environment and generate one or more data streams. In some example embodiments, a processor of the vision system 1102 may utilize a data stream to construct 3D point cloud that may represent a 3D-scan of the target area. As an example, a data stream recorded by these LiDAR sensors may capture various operations of a material handling site e.g. movement of the one or more articles 1114, e.g. from the induction portion 1116 towards the sorter portion 1106 or from the ASRS 1122 to the merge portion 1120, and so on. Further, data streams from various LiDAR sensors 1104 may also capture operations and/or actions performed by various machines of the material handling site. For instance, in an example, the data stream may capture movement of various mechanical components e.g. conveyor belts etc. of the singulation system. Furthermore, the data streams may also capture operations performed by one or more workers in that target area.

According to some example embodiments, one or more components of the example material handling system 1100, such as, but not limited to, the sorter portion 1106, the induction portion 1116, the merge portion 1120, the vision system 1102, and/or the like, may be communicably coupled to at least one of a central system e.g., a distribution center (DC) execution system 1126 (or a warehouse management system, a labor management system, a machine control system, and/or another system) and/or a controller 1128. In one or more embodiments, the controller 1128 is configured for machine control. The term "communicably coupled" refers to two or more components (for example, but not limited to, the sorter portion 1106, the induction portion 1116, the merge portion 1120, the vision system 1102, the DC execution system 1126 and the controller 1128 as shown in FIG. 11) being connected through wired means (for example but not limited to, wired Ethernet) and/or wireless means (for example but not limited to, Wi-Fi, Bluetooth, ZigBee), such that data and/or information may be transmitted to and/or received from these components.

Figure 12:
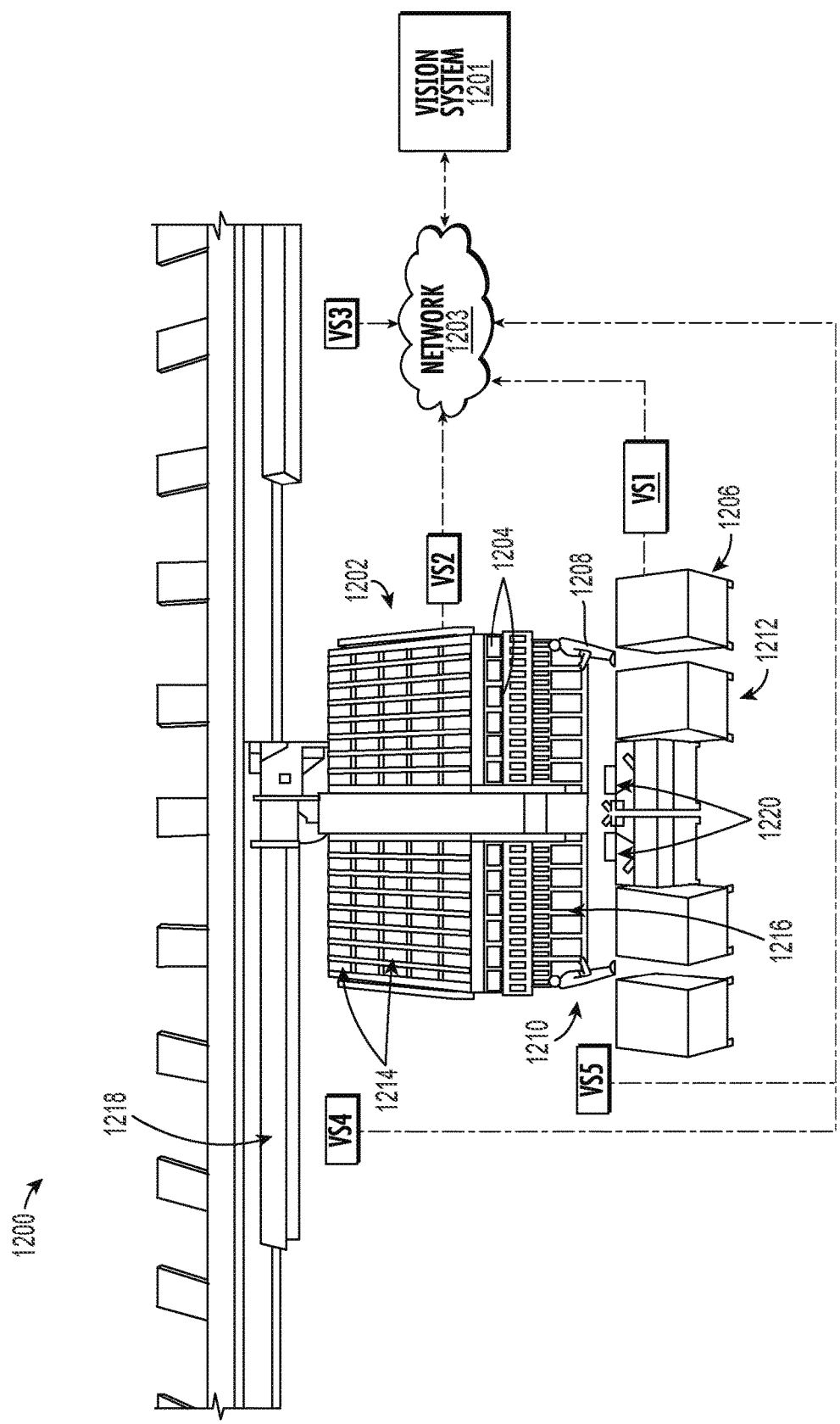
FIG. 12 illustrates a schematic view of a target area of the material handling system including the LiDAR based vision system, in accordance with one or more embodiments described herein.

FIG. 12 illustrates a schematic view 1200 of a target area of the material handling system 1100 including the LiDAR based vision system, according to an example embodiment. The target area may correspond to an area of a distribution center (DC). In one or more embodiments, the DC may receive goods in bulk from various manufacturers, suppliers, stores, shipping stations, and the like, and may store and/or handle received goods until the goods are further picked and/or shipped. Further, the received goods may be transferred into totes and/or containers of appropriate size, shape, material, etc. for storage and/or further processing. In accordance with some example embodiments described herein, the DC may include a vision system 1201 that may be communicatively coupled, via a network 1203, to multiple LiDAR based sensor units VS1, VS2, VS3, VS4, etc., as illustrated in FIG. 12. Similar to as described earlier in reference to FIG. 11, these LiDAR based sensor units (VS1-VSn) may be capable of recording data streams including 3D scan of a target area. The network 1203 may correspond to a wired or wireless communication network. In one or more embodiments, the vision system 101 corresponds to an asset from a portfolio of assets.

Illustratively, in some example embodiments, the DC may have a replenishment area 1202 for replenishing one or more containers 1204 with goods arriving at the replenishment area 1202 in multiple stock keeping units (SKUs) 1206. The term 'replenishment area' as used herein may refer to an area, system, workstation, and the like in the DC for transferring goods from the multiple SKUs 1206 into one or more containers 1204. The replenishment area 1202 may have a collaborative system of multiple material handling devices and systems, such as, but not limited to, infeed conveyors, outfeed conveyors, goods to operator workstations, devices, staging units, and the like. Transferring goods from an SKU into the containers 1204 may be automated, for example, may be done by a robotic tool, and/or may be a manual process carried out by an operator, such as operators 1208 and 1210, as shown in FIG. 12. In accordance with some example embodiments described herein, one or more LiDAR based sensors are associated with the replenishment area 1202 to perform a 3D scan that captures activities, operations, devices, and/or workers in the replenishment area 1202. Accordingly, in one or more embodiments, there are multiple vision systems that may be associated with different sections of the DC. In one or more embodiments, these vision systems employ LiDAR based sensors to record the activities related to operators, items, and/or machines within the respective section. As an example, as illustrated in FIG. 12, a vision system unit VS2 with one or more LiDAR sensors 204 is associated with the replenishment area 1202.

According to said example embodiments, an SKU 1206 may include goods of a similar type, size, shape, and/or any other common characteristic. In an embodiment, one or more SKUs 1206 may be grouped together and stacked on a pallet 1212, as shown in FIG. 12. The SKUs 1206 may be grouped based on a common characteristic, such as type of goods. Additionally, or alternatively, mixed SKUs 1206 may be grouped randomly and placed on the pallet 1212. The SKUs 1206 may be grouped and stacked on the pallet 1212 at the DC for ease of handling. In some embodiments, each SKU 1206 and each pallet 1212 may include a respective identifier (e.g. a barcode label, RFID tag) that is scanned at the replenishment area 1202. The scanned information indicates, in one or more embodiments, a location of the pallet 1212 at the replenishment area 1202. In some example embodiments, one or more LiDAR based sensor units may also be located in the DC to perform 3D scan of an area including the SKUs 1206 and/or pallets 1212. Illustratively, in an example, two vision system units VS1 and VS4 with LiDAR sensors may be located to track activities, operations, and/or characteristics associated with the SKUs 1206 and/or the pallets 1212.

In accordance with one or more embodiments, the replenishment area 1202 includes a gravity flow rack 1214 for staging and/or conveying one or more containers 1204. Further, the replenishment area 1202 may include multiple replenishment zones. The gravity flow rack 1214 may be placed between different replenishment zones, such that the gravity flow rack 1214 may convey replenished containers from a first replenishment zone 1216 to a second replenishment zone 1218 and convey empty containers back from the second replenishment zone 1218 to the first replenishment zone 1216. The gravity flow rack 1214 may also function as a staging area for the empty and/or filled containers 1204 until the containers 1204 are handled by the operator 1208 and/or a robotic tool. In accordance with some example embodiments, the vision system unit VS2 may scan the area including the gravity flow rack 1214.

The replenishment area 1202 may further include one or more devices 1220. The devices 1220 may refer to any portable and/or fixed device (e.g. a human machine interface HMI) that may be communicably coupled to a central controller (e.g. the controller 1128). In some examples, the devices 1220 may include an input/output interface which may be used for assisting the operator 1208 in the replenishment process. According one or more embodiments, the devices 1220 correspond to or include for example, but not limited to, scanners, imagers, displays, computers, communication devices, headsets, and the like. According to some example embodiments, the devices 1220 may further receive data, commands, workflows, etc. from the central controller and/or any other device that may be communicably coupled to the devices 1220. According to some example embodiments, the vision system units VS1 and VS5 using the LiDAR based sensors may perform a 3D scan of area including the one or more devices 1220.

According to some example embodiments, the data stream captured by the vision system 1201 may monitor various activities, operations, individuals, and/or equipment in the DC. For instance, the data stream may be used to monitor arrival of the pallets 1212 having one or more SKUs 1206 at the replenishment area 1202 of the DC. Further, the data stream may monitor scanning of a pallet identifier and/or an SKU identifier using the devices 1220 by any of the operators 1208 and/or 1210. In some example embodiments, the data stream captured by the LiDAR sensors 204 of the vision system 1201 may also include an operation by a robotic tool (not shown) and/or the operators (1208, 1210) to pick one or more of the containers 1204 on the gravity flow rack 1214 for replenishing the one or more containers 1204 with the goods that may be in the SKU 1206 and/or the pallet 1212. Further, in some example embodiments, the data stream captured by the LiDAR sensors 204 of the vision system units VS2, VS3, and/or VS4 may include conveyance or movement of the one or more containers 1204 that may be on the gravity flow rack 1214. In this aspect, the containers 1204 may be conveyed from the first replenishment zone 1216 to the second replenishment zone 1218 through the gravity flow rack 1214. In some example embodiments, the data stream may also include monitoring of empty container(s) that may be placed on the gravity flow rack 1214 for transferring back to the first replenishment zone 1216 for receiving goods from a next SKU and/or pallet. In an example embodiment, the data stream also includes movement of some containers to one or more shuttle totes that can be moved for storing goods in an Automated Storage and Retrieval System (ASRS) in the DC.

Figure 13:
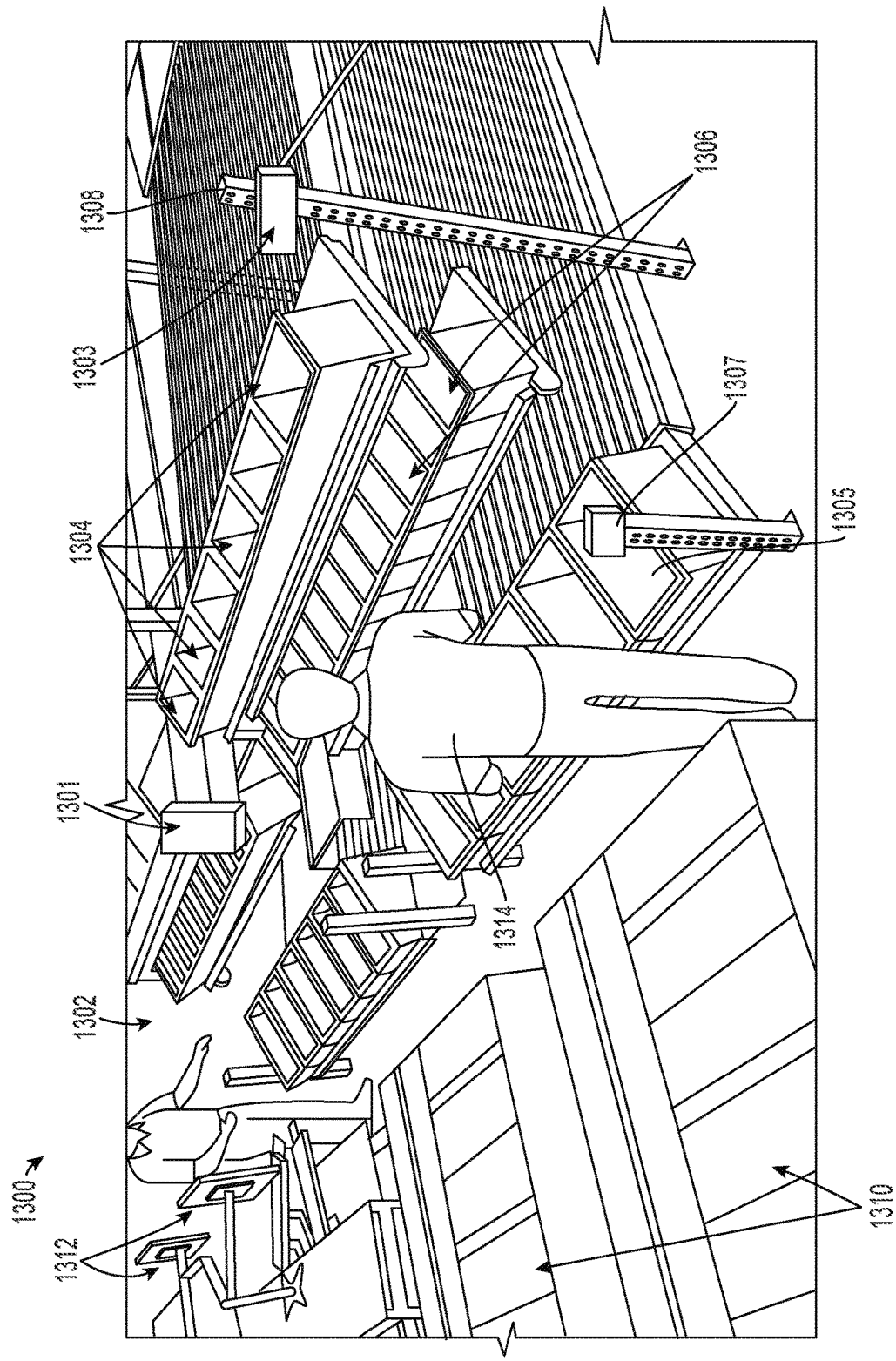
FIG. 13 illustrates an example scenario depicting monitoring of an operation performed by a worker in a material handling environment by using LiDAR based vision system, in accordance with one or more embodiments described herein.

FIG. 13 illustrates an example scenario 1300 depicting monitoring of an operation performed by a worker in a material handling environment by using LiDAR based vision system (e.g. the vision system 1102), according to an example embodiment. In some example embodiments, the operation may be performed in a replenishment zone of a distribution center. FIG. 13 illustrates an example of a replenishment zone 1302 of a distribution center. As described earlier, in one or more embodiments, a material handling environment includes a plurality of vision systems. Illustratively, in some example embodiments, a distribution center DC includes a plurality of vision systems (1301, 1303, 1307 etc.). Each of these vision systems (1301-1307) include one or more LiDAR based sensors that may be installed and/or mounted at various sections of the material handling environment. In this aspect, each of these vision systems 1301-1307 are capable of capturing a data stream (i.e. a 3D scan) of a target area. In one or more embodiments, the vision systems 1301-1307 correspond to respective assets from a portfolio of assets.

According to some example embodiments, the operation monitored by using LiDAR based vision systems corresponds to replenishing of one or more containers. The containers may be placed on a gravity flow rack 1308 and, in one or more embodiments, is replenished with goods from the one or more SKUs 1310 that may be arriving at a replenishment area of the replenishment zone 1302. According to some example embodiments, there may be different sizes of containers for replenishment in the DC. For instance, a first set of containers 1304 may be of moderate size, whereas a second set of containers 1306 may be smaller than the first set of containers 1304, and a third set of containers 1305 may be larger than containers of the first set of containers 1304. In one or more embodiments, the replenishment of containers is based on a size of the containers. According to one or more embodiments, each of the containers 1304, 1306, 1305 have an associated container identifier (not shown). The container identifier may refer to a unique identifier that may be used to identify a particular container, such as, but not limited to, a serial number, a barcode label, RFID tag, etc. The container identifier may include information regarding the container, such as, but not limited to, type, size, capacity, weight, shape, and the like.

In accordance with said example embodiments, a container identifier for a container may be scanned before performing each replenishment operation for that container. By scanning the container identifier, a central controller (e.g. the controller 1128) and/or any other computing device in the DC, may track an occupied volume of the container. Further, based on this information, the central controller may calculate a current capacity i.e. based on a maximum capacity of the container and the occupied volume. Said that, in accordance with said example embodiments, to maximize storage capacity and overall efficiency, it may be desired to pick appropriately sized container(s) from various sized containers for storing goods from the SKUs 1310.

Figure 14:
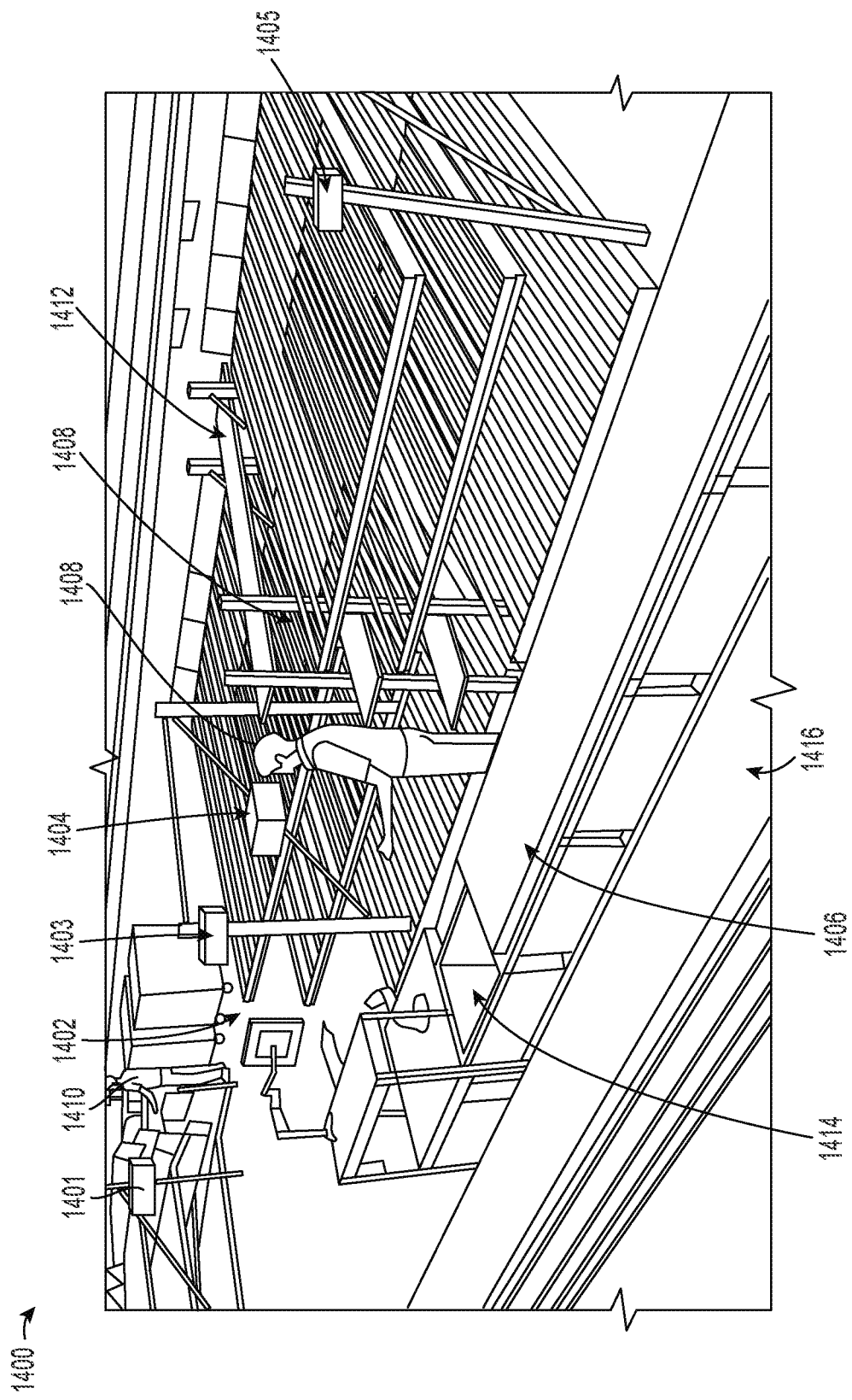
FIG. 14 illustrates another example scenario depicting another operation performed in a material handling environment that can be monitored by using LiDAR based vision system, in accordance with one or more embodiments described herein.

FIG. 14 illustrates another example scenario 1400 depicting another operation performed in a material handling environment that is monitored by using LiDAR based vision system (e.g. the vision system 1102), according to an example embodiment. FIG. 14 illustrates a perspective view of a second replenishment zone 1402 of the distribution center (DC), in accordance with one or more embodiments of the present disclosure. Illustratively, in some example embodiments, a distribution center DC includes a plurality of vision systems (1401, 1403, 1405 etc.). Each of these vision systems (1401-1405) includes one or more LiDAR based sensors that may be installed and/or mounted at various sections of the material handling environment. In this aspect, each of these vision systems 1401-1405 is configured to capture a data stream (i.e. a 3D scan) of a target area. In one or more embodiments, the plurality of vision systems (1401-1405) correspond to respective assets from a portfolio of assets. In accordance with some example embodiments, the data stream from the LiDAR sensor-based vision system captures an operation related to a replenishment process in the second replenishment zone 1402.

According to some example embodiments, a replenishment process illustrated in FIG. 14 includes replenishing of one or more containers from a second set of containers 1404 with goods from the replenished first set of containers 1406 that may be arriving at the second replenishment zone 1402 (e.g. through the gravity flow rack 1408). In some example embodiments, the second set of containers 1404 may correspond to shuttle totes used in an ASRS (e.g., the ASRS 1122) that may be having multiple compartments of different size. The shuttle totes may be partially filled or empty and may be used to store goods in a storage facility, such as the ASRS 1122 as illustrated in FIG. 11.

Figure 15:
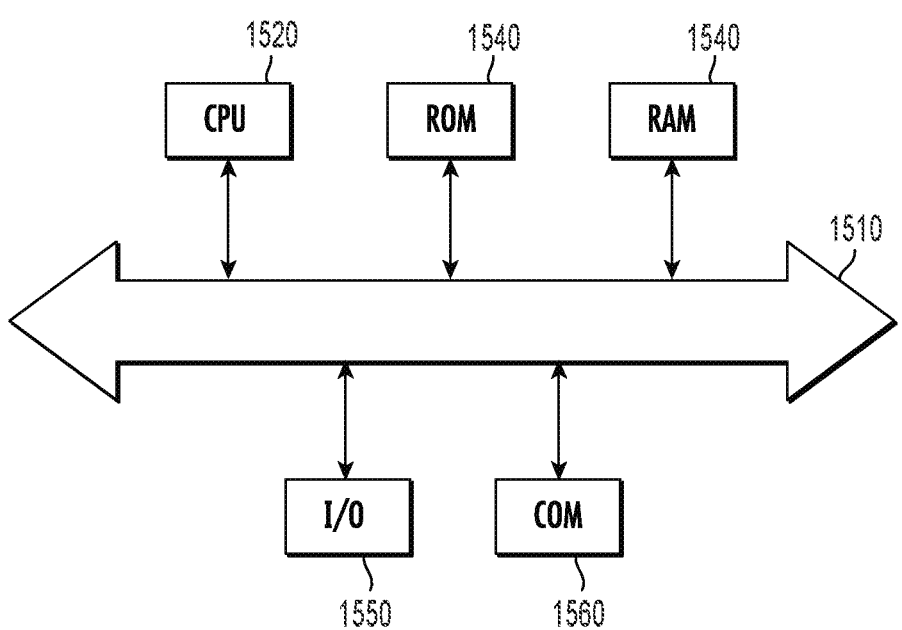
FIG. 15 illustrates a functional block diagram of a computer that may be configured to execute techniques described in accordance with one or more embodiments described herein.

FIG. 15 depicts an example system 1500 that may execute techniques presented herein. FIG. 15 is a simplified functional block diagram of a computer that may be configured to execute techniques described herein, according to exemplary embodiments of the present disclosure. Specifically, the computer (or "platform" as it may not be a single physical computer infrastructure) may include a data communication interface 1560 for packet data communication. The platform also may include a central processing unit ("CPU") 1520, in the form of one or more processors, for executing program instructions. The platform may include an internal communication bus 1510, and the platform also may include a program storage and/or a data storage for various data files to be processed and/or communicated by the platform such as ROM 1530 and RAM 1540, although the system 1500 may receive programming and data via network communications. The system 1500 also may include input and output ports 1550 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

It is intended that the specification and examples be considered as exemplary only, with a true scope and spirit of the disclosure being indicated by the following claims.

What is claimed is:

1. A system for monitoring performance of one or more warehouses, comprising:
    one or more processors;
    a memory; and
    one or more programs stored in the memory, the one or more programs comprising instructions configured to:
        receive a request to generate a dashboard visualization associated with a portfolio of assets, the request comprising:
            a location of the portfolio of assets; and
            at least one KPI descriptor; and
        in response to the request:
            obtain, based on the location of the portfolio of assets and the at least one KPI descriptor, aggregated data associated with the portfolio of assets;
            determine metrics associated with the portfolio of assets for the aggregated data;
            provide the dashboard visualization to an electronic interface of a computing device, the dashboard visualization comprising at least one metric of the metrics associated with the portfolio of assets;
            configure the dashboard visualization based on a first asset hierarchy level of a plurality of asset hierarchy levels, wherein the first asset hierarchy level corresponds to a first portion of the portfolio of assets, wherein the first portion of the portfolio of assets comprises one or more assets in a first warehouse of the one or more warehouses, and wherein configuring the dashboard visualization based on the first asset hierarchy level comprises:
                causing a visual representation of at least a first metric of the metrics to be rendered on the dashboard visualization, wherein the first metric is indicative of a performance of the first portion of the portfolio of assets;
            configure the dashboard visualization based on a second asset hierarchy level of the plurality of asset hierarchy levels, wherein the second asset hierarchy level corresponds to a second portion of the portfolio of assets, wherein the second portion of the portfolio of assets comprises one or more other assets in a second warehouse of the one or more warehouses and the first portion of the portfolio of assets, wherein the first warehouse and the second warehouse are located in a geographical zone; and
            configure the dashboard visualization to a remote-control format such that the dashboard visualization is configured to remotely control at least one of the portfolio of assets and enable real-time collaboration with a remote computing device.

2. The system of claim 1, the request further comprising a user identifier, the user identifier describing a user role for a user associated with access of the dashboard visualization via the electronic interface, and, in response to the request, the aggregated data is obtained based on the user identifier.

3. The system of claim 2, the one or more programs further comprising instructions configured to:
    configure the dashboard visualization based on the user identifier.

4. The system of claim 1, the one or more programs further comprising instructions configured to:
    determine a list of prioritized actions for the portfolio of assets based on the metrics; and
    provide the list of prioritized actions to the electronic interface via the dashboard visualization.

5. The system of claim 4, the one or more programs further comprising instructions configured to:
    group the prioritized actions for the portfolio of assets based on relationships between the aggregated data; and
    configure the dashboard visualization based on the grouping of the prioritized actions for the portfolio of assets.

6. The system of claim 4, the one or more programs further comprising instructions configured to:
    rank, based on impact of respective prioritized actions with respect to the portfolio of assets, the prioritized actions to generate the list of the prioritized actions; and
    provide the list of the prioritized actions to the electronic interface via the dashboard visualization.

7. The system of claim 1, the one or more programs further comprising instructions configured to:
    determine an alerts list associated with one or more recommendations for the portfolio of assets based on the metrics; and
    provide the alerts list to the electronic interface via the dashboard visualization.

8. The system of claim 1, the one or more programs further comprising instructions configured to:
    receive a voice input, the voice input comprising the request to generate the dashboard visualization, the voice input comprising:
    voice input data, the voice input data comprising one or more asset insight requests associated with the portfolio of assets; and
    in response to the voice input:
        perform a natural language query with respect to the voice input data, the natural language query obtaining one or more attributes associated with the one or more asset insight requests;
        obtain, based on the one or more attributes, aggregated data associated with the portfolio of assets; and
        determine one or more recommendations related to the portfolio of assets based on the aggregated data, the dashboard visualization comprising the one or more recommendations for the portfolio of assets.

9. The system of claim 1, the one or more programs further comprising instructions configured to:
    configure a site performance chart of one or more assets from the portfolio of assets based on one or more attributes associated with portfolio of assets.

10. The system of claim 1,
    wherein configuring the dashboard visualization based on the second asset hierarchy level comprises:
        causing a second visual representation of at least a second metric of the metrics to be rendered on the dashboard visualization, wherein the second metric is indicative of a performance of the second portion of the portfolio of assets.

11. The system of claim 10, wherein the dashboard visualization comprises a third visual representation of a geographical area that includes the geographical zone and a location indicator corresponding to the geographical zone, wherein the location indicator is positioned within the third visual representation at a location corresponding to the geographical zone.

12. A method of monitoring performance of one or more warehouses comprising:
    receiving a request to generate a dashboard visualization associated with a portfolio of assets, the request comprising:
        a location of the portfolio of assets; and
        at least one KPI descriptor; and
    in response to the request:
        obtaining, based on the location of the portfolio of assets and the at least one KPI descriptor, aggregated data associated with the portfolio of assets;
        determining metrics associated with the portfolio of assets for the aggregated data;
        providing the dashboard visualization to an electronic interface of a computing device, the dashboard visualization comprising at least one metric of the metrics associated with the portfolio of assets;
        configuring the dashboard visualization based on a first asset hierarchy level of a plurality of asset hierarchy levels, wherein the first asset hierarchy level corresponds to a first portion of the portfolio of assets, wherein the first portion of the portfolio of assets comprises one or more assets in a first warehouse of the one or more warehouses, and wherein configuring the dashboard visualization based on the first asset hierarchy level comprises:
            causing a visual representation of at least a first metric of the metrics to be rendered on the dashboard visualization, wherein the first metric is indicative of a performance of the first portion of the portfolio of assets;
        configuring the dashboard visualization based on a second asset hierarchy level of the plurality of asset hierarchy levels, wherein the second asset hierarchy level corresponds to a second portion of the portfolio of assets, wherein the second portion of the portfolio of assets comprises one or more other assets in a second warehouse of the one or more warehouses and the first portion of the portfolio of assets, wherein the first warehouse and the second warehouse are located in a geographical zone; and
        configuring the dashboard visualization to a remote-control format such that the dashboard visualization is configured to remotely control at least one of the portfolio of assets and enable real-time collaboration with a remote computing device.

13. The method of claim 12, wherein the request comprises a user identifier, the user identifier describing a user role for a user associated with the dashboard visualization via the electronic interface, and, in response to the request, the aggregated data is obtained based on the user identifier.

14. The method of claim 13, further comprising:
    configuring the dashboard visualization based on the user identifier.

15. The method of claim 12, further comprising:
    determining a list of prioritized actions for the portfolio of assets based on the metrics; and
    providing the list of prioritized actions to the electronic interface via the dashboard visualization.

16. The method of claim 15, further comprising:
    grouping the prioritized actions for the portfolio of assets based on relationships between the aggregated data; and
    configuring the dashboard visualization based on the grouping of the prioritized actions for the portfolio of assets.

* * * * *